US011811692B2

(12) United States Patent
Abotabl et al.

(10) Patent No.: US 11,811,692 B2
(45) Date of Patent: Nov. 7, 2023

(54) DYNAMIC ANTENNA ADAPTATION IN SECONDARY CELL DORMANCY

(71) Applicant: QUALCOMM Incorporated, San Diego, CA (US)

(72) Inventors: Ahmed Attia Abotabl, San Diego, CA (US); Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/546,746

(22) Filed: Dec. 9, 2021

(65) Prior Publication Data

US 2023/0188279 A1 Jun. 15, 2023

(51) Int. Cl.

| | |
|---|---|
| ***H04L 5/00*** | (2006.01) |
| ***H04W 24/10*** | (2009.01) |
| ***H04W 72/10*** | (2009.01) |
| ***H04W 72/23*** | (2023.01) |

(52) U.S. Cl.

CPC ........... *H04L 5/0048* (2013.01); *H04W 24/10* (2013.01); *H04W 72/23* (2023.01)

(58) Field of Classification Search

CPC ............................ H04L 5/0048; H04W 72/23

See application file for complete search history.

(56) References Cited

U.S. PATENT DOCUMENTS

2019/0021052 A1* 1/2019 Kadiri ............... H04W 52/0206
2021/0218455 A1* 7/2021 Park ......................... H04B 7/08

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A user equipment (UE) may receive, from a base station, signaling indicating a channel state information (CSI) report configuration. The CSI report configuration may indicate a mapping between one or more CSI reference signal (CSI-RS) resources for use in a dormancy state for one or more secondary cells and at least one antenna panel configuration of the base station. Based on the configuration, the UE may receive one or more CSI-RSs on the CSI-RS resources of the one or more dormant secondary cells. In some cases, the UE may receive an antenna adaptation indication based on monitoring a downlink control channel. Additionally or alternatively, the UE may receive scheduling information for a downlink shared channel containing an antenna adaptation indication. The UE may transmit a message reporting CSI feedback to the base station in accordance with the antenna adaptation indication.

26 Claims, 16 Drawing Sheets

N1
N2
155
110
115
125
105
120
145
140
135
130
150
100

DYNAMIC ANTENNA ADAPTATION IN SECONDARY CELL DORMANCY

FIELD OF TECHNOLOGY

The present disclosure relates to wireless communications, including dynamic antenna adaptation in secondary cell (Scell) dormancy.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device, such as a base station, may transmit or receive signals using multiple antennas or combinations of antennas. To reduce power consumption, the device may power down or turn off some antenna panels or antenna elements (e.g., a subpanel of an antenna panel), which may be referred to as panel adaptation, dynamic panel adaptation, or dynamic antenna adaptation. In some cases, turning off antenna panels or antenna elements may affect operations at a UE being served by the base station.

SUMMARY

The described techniques relate to improved methods, systems, devices, and apparatuses that support dynamic antenna adaptation in secondary cell (Scell) dormancy. Generally, the described techniques provide for a UE operating in a dormancy state in an Scell to determine accurate channel state information (CSI) feedback by obtaining CSI configurations corresponding to antenna panel configurations at a base station serving the Scell. The base station serving the Scell may perform dynamic antenna adaptation, where the base station may dynamically turn off and/or turn on a subset of the antenna panels to adjust throughput or power consumption; in some examples, the base station may perform dynamic antenna adaptation while the Scell is dormant, while in others, the base station may perform dynamic antenna adaptation only when the Scell is active (e.g., may refrain from performing dynamic antenna adaptation while the Scell is dormant). The UE may receive signaling from the base station indicating a CSI report configuration for use in a dormancy state for the Scell (e.g., and, in some cases, other additional Scells). While operating in the dormancy state, the UE may receive one or more CSI reference signals (CSI-RSs) on CSI-RS resources of the Scell in accordance with the indicated CSI report configuration. The UE may perform measurements based on receiving the one or more CSI-RSs and may transmit, to the base station, a message indicating CSI feedback.

When dynamic antenna adaptation is not supported in the dormant Scell (e.g., the base station refrains from performing panel adaptation while the Scell is dormant), the UE may use a CSI configuration that was most recently indicated to the UE before the UE entered the dormancy state, or may use a CSI configuration dedicated for use in the dormancy state. Alternatively, in cases where dynamic antenna adaptation is supported in the dormant Scell, the UE may monitor a physical downlink control channel (PDCCH) of the serving base station for an indication of the CSI configuration to use for performing CSI procedures. In some examples, the UE may additionally or alternatively monitor the PDCCH for scheduling information for a physical downlink shared channel (PDSCH); the UE may receive a message via the PDSCH indicating the CSI configuration to use. The UE may perform CSI measurements on the CSI-RS and provide CSI feedback based on the indicated CSI configurations while operating in the dormancy state. A method for wireless communications at a UE is described. The method may include receiving, from a base station, signaling indicating a CSI report configuration that indicates CSI-RS resources for use in a dormancy state for one or more Scells, where the CSI-RS resources are mapped to at least one antenna panel configuration of the base station, receiving, in the dormancy state, one or more CSI-RSs on the CSI-RS resources of the one or more Scells according to the CSI report configuration, and transmitting, to the base station, a message reporting CSI feedback based on measurements associated with the received one or more CSI-RSs.

An apparatus for wireless communications at a UE is described. The apparatus may include a processor, memory coupled with the processor, and instructions stored in the memory. The instructions may be executable by the processor to cause the apparatus to receive, from a base station, signaling indicating a CSI report configuration that indicates CSI-RS resources for use in a dormancy state for one or more Scells, where the CSI-RS resources are mapped to at least one antenna panel configuration of the base station, receive, in the dormancy state, one or more CSI-RSs on the CSI-RS resources of the one or more Scells according to the CSI report configuration, and transmit, to the base station, a message reporting CSI feedback based on measurements associated with the received one or more CSI-RSs.

Another apparatus for wireless communications at a UE is described. The apparatus may include means for receiving, from a base station, signaling indicating a CSI report configuration that indicates CSI-RS resources for use in a dormancy state for one or more Scells, where the CSI-RS resources are mapped to at least one antenna panel configuration of the base station, means for receiving, in the dormancy state, one or more CSI-RSs on the CSI-RS resources of the one or more Scells according to the CSI report configuration, and means for transmitting, to the base station, a message reporting CSI feedback based on measurements associated with the received one or more CSI-RSs.

A non-transitory computer-readable medium storing code for wireless communications at a UE is described. The code may include instructions executable by a processor to receive, from a base station, signaling indicating a CSI report configuration that indicates CSI-RS resources for use in a dormancy state for one or more Scells, where the CSI-RS resources are mapped to at least one antenna panel configuration of the base station, receive, in the dormancy state, one or more CSI-RSs on the CSI-RS resources of the one or more Scells according to the CSI report configuration, and transmit, to the base station, a message reporting CSI feedback based on measurements associated with the received one or more CSI-RSs.

Some examples of the method, apparatuses, and non-transitory computer-readable medium described herein may further include operations, features, means, or instructions for receiving, in the dormancy state, an antenna adaptation indication based on monitoring a downlink control channel, where the message reporting the CSI feedback may be transmitted based on the antenna adaptation indication.

In some examples of the method, apparatuses, and non-transitory computer-readable medium described herein, the antenna adaptation indication may be received during a monitoring occasion of the downlink channel configured for receiving the antenna adaptation indication.

Some examples of the method, apparatuses, and non-transitory computer-readable medium described herein may further include operations, features, means, or instructions for receiving scheduling information for a downlink shared channel based on monitoring a downlink control channel and receiving, via the downlink shared channel and based on the scheduling information, a message including an antenna adaptation indication, where the message reporting the CSI feedback may be transmitted in accordance with the antenna adaptation indication.

In some examples of the method, apparatuses, and non-transitory computer-readable medium described herein, receiving the one or more CSI-RSs may include operations, features, means, or instructions for receiving a first CSI-RS according to a first CSI resource based on determining that the first CSI resource may be a most recently configured CSI resource among a set of CSI resources.

In some examples of the method, apparatuses, and non-transitory computer-readable medium described herein, the CSI report configuration may be received before entering the dormant state.

In some examples of the method, apparatuses, and non-transitory computer-readable medium described herein, the CSI report configuration for use in the dormancy state may be different than a second CSI report configuration for use in an active state for the one or more Scells.

In some examples of the method, apparatuses, and non-transitory computer-readable medium described herein, receiving signaling indicating the CSI report configuration may include operations, features, means, or instructions for receiving, as part of the signaling, an indication to transition to the dormancy state for the one or more Scells and transmitting the message reporting CSI feedback in accordance with the CSI report configuration based on receiving the indication to transition to the dormancy state.

In some examples of the method, apparatuses, and non-transitory computer-readable medium described herein, the signaling includes DCI.

Some examples of the method, apparatuses, and non-transitory computer-readable medium described herein may further include operations, features, means, or instructions for receiving a DCI message or a MAC-CE message including an antenna adaptation indication, where the message reporting the CSI feedback may be transmitted in accordance with the antenna adaptation indication.

In some examples of the method, apparatuses, and non-transitory computer-readable medium described herein, the antenna adaptation indication indicates an antenna adaptation mode corresponding to an antenna panel configuration of the base station.

A method for wireless communications at a base station is described. The method may include transmitting signaling indicating a CSI report configuration that indicates CSI-RS resources for use in a dormancy state for one or more Scells, where the CSI-RS resources are mapped to at least one antenna panel configuration of the base station, transmitting, to a UE that is in the dormancy state, one or more CSI-RSs on the CSI-RS resources of the one or more Scells according to the CSI report configuration, and receiving, from the UE, a message reporting CSI feedback based on measurements associated with the received one or more CSI-RSs.

An apparatus for wireless communications at a base station is described. The apparatus may include a processor, memory coupled with the processor, and instructions stored in the memory. The instructions may be executable by the processor to cause the apparatus to transmit signaling indicating a CSI report configuration that indicates CSI-RS resources for use in a dormancy state for one or more Scells, where the CSI-RS resources are mapped to at least one antenna panel configuration of the base station, transmit, to a UE that is in the dormancy state, one or more CSI-RSs on the CSI-RS resources of the one or more Scells according to the CSI report configuration, and receive, from the UE, a message reporting CSI feedback based on measurements associated with the received one or more CSI-RSs.

Another apparatus for wireless communications at a base station is described. The apparatus may include means for transmitting signaling indicating a CSI report configuration that indicates CSI-RS resources for use in a dormancy state for one or more Scells, where the CSI-RS resources are mapped to at least one antenna panel configuration of the base station, means for transmitting, to a UE that is in the dormancy state, one or more CSI-RSs on the CSI-RS resources of the one or more Scells according to the CSI report configuration, and means for receiving, from the UE, a message reporting CSI feedback based on measurements associated with the received one or more CSI-RSs.

A non-transitory computer-readable medium storing code for wireless communications at a base station is described. The code may include instructions executable by a processor to transmit signaling indicating a CSI report configuration that indicates CSI-RS resources for use in a dormancy state for one or more Scells, where the CSI-RS resources are mapped to at least one antenna panel configuration of the base station, transmit, to a UE that is in the dormancy state, one or more CSI-RSs on the CSI-RS resources of the one or more Scells according to the CSI report configuration, and receive, from the UE, a message reporting CSI feedback based on measurements associated with the received one or more CSI-RSs.

Some examples of the method, apparatuses, and non-transitory computer-readable medium described herein may further include operations, features, means, or instructions for transmitting, to the UE in the dormancy state, an antenna adaptation indication over a downlink control channel, where the message reporting the CSI feedback may be received based on the antenna adaptation indication.

In some examples of the method, apparatuses, and non-transitory computer-readable medium described herein, the antenna adaptation indication may be transmitted during a monitoring occasion of the downlink channel configured for transmitting the antenna adaptation indication.

Some examples of the method, apparatuses, and non-transitory computer-readable medium described herein may further include operations, features, means, or instructions for transmitting scheduling information for a downlink shared channel over a downlink control channel and transmitting, via the downlink shared channel and based on the scheduling information, a message including an antenna adaptation indication, where the message reporting the CSI feedback may be received in accordance with the antenna adaptation indication.

In some examples of the method, apparatuses, and non-transitory computer-readable medium described herein, transmitting the one or more CSI-RSs may include operations, features, means, or instructions for transmitting a first CSI-RS according to a first CSI resource based on determining that the first CSI resource may be a most recently configured CSI resource among a set of CSI resources.

In some examples of the method, apparatuses, and non-transitory computer-readable medium described herein, the CSI report configuration for use in the dormancy state may be different than a second CSI report configuration for use in an active state for the one or more Scells.

In some examples of the method, apparatuses, and non-transitory computer-readable medium described herein, transmitting signaling indicating the CSI report configuration may include operations, features, means, or instructions for transmitting, as part of the signaling, an indication to transition to the dormancy state for the one or more Scells and receiving the message reporting CSI feedback in accordance with the CSI report configuration based on transmitting the indication to transition to the dormancy state.

In some examples of the method, apparatuses, and non-transitory computer-readable medium described herein, the signaling includes DCI.

Some examples of the method, apparatuses, and non-transitory computer-readable medium described herein may further include operations, features, means, or instructions for transmitting a DCI message or a MAC-CE message including an antenna adaptation indication, where the message reporting the CSI feedback may be received in accordance with the antenna adaptation indication.

In some examples of the method, apparatuses, and non-transitory computer-readable medium described herein, the antenna adaptation indication indicates an antenna adaptation mode corresponding to an antenna panel configuration of the base station.

DETAILED DESCRIPTION

Figure 1:
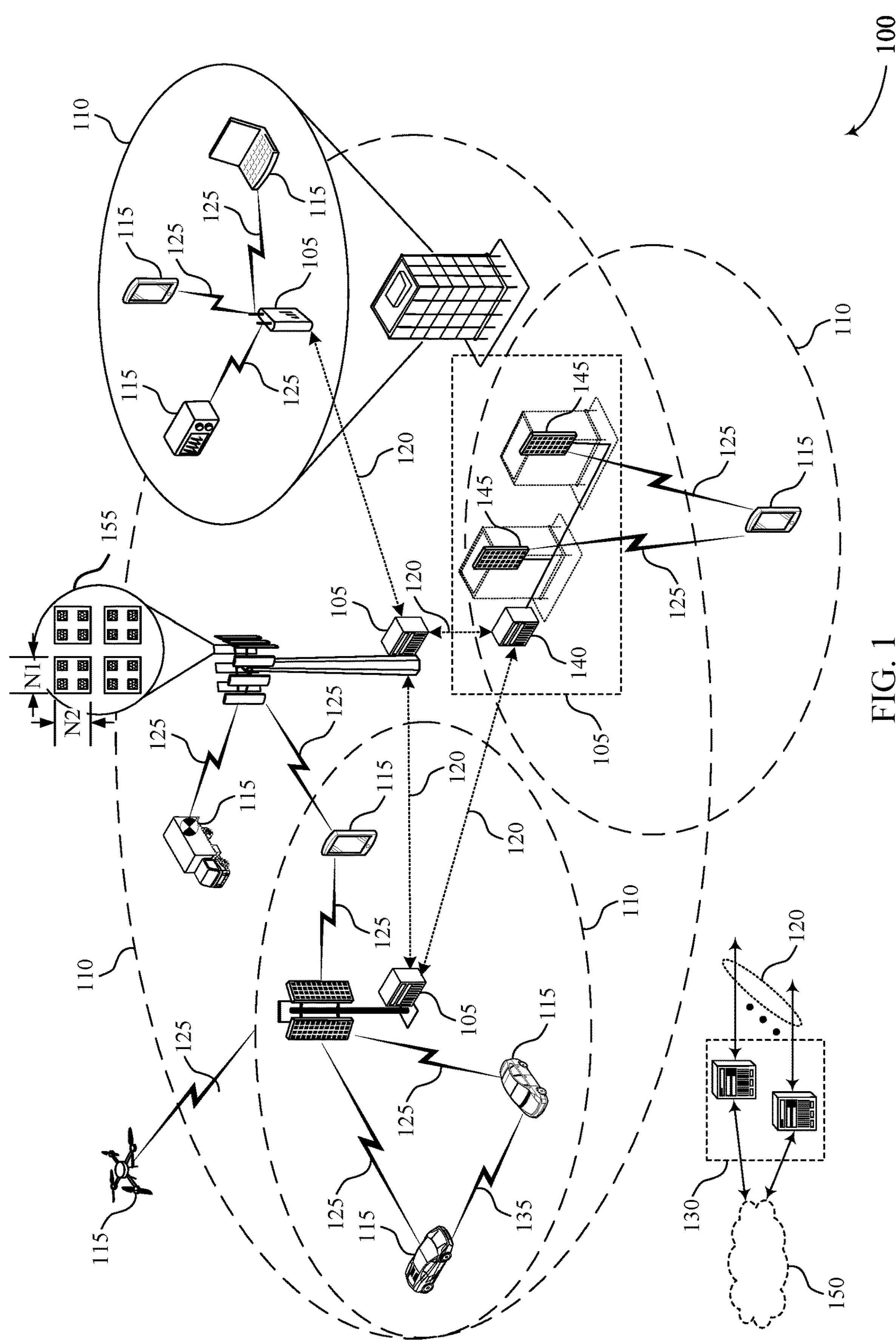
FIGS. 1 and 2 illustrate examples of wireless communications systems that support dynamic antenna adaptation in secondary cell (Scell) dormancy in accordance with aspects of the present disclosure.

In some wireless communications systems, devices (e.g., user equipment (UE), base stations) may support multiple input multiple output (MIMO) communications, in which a device transmits and receives multiple signals using different spatial layers. In some cases, the device may transmit and receive the multiple signals using multiple antennas or combinations of antennas. For instance, a base station may have multiple antenna panels, where each antenna panel includes multiple antenna elements. In such cases, each antenna element may be associated with one or more radio frequency (RF) components. The use of a relatively large number of antenna elements (and corresponding RF components), however, may be associated with considerable power consumption. Thus, as the quantity of antenna elements increases, the power consumption may also increase; consequently, power consumption in a system with many multiple-panel base stations may be significant.

A base station may perform adaptive procedures to adjust power consumption, for instance, based on traffic, channel conditions, or the like. For example, the base station may perform dynamic antenna adaptation by dynamically activating or deactivating (e.g., turning off, powering down) a subset of antenna panels or antenna subpanels. If traffic in a cell served by the base station is relatively low, the base station may reduce the number of active panels, which may conserve power while providing service to the cell. Such techniques may be referred to as panel adaptation, dynamic antenna adaptation, or other terminology. Additionally, or alternatively, the base station may control (e.g., via downlink control information (DCI)) a dormancy state at the cell. For instance, the cell may be a secondary cell (Scell). When there is relatively little or no traffic in the Scell, the base station may transition the Scell to a dormancy state to reduce power consumption. The base station may switch the Scell to an active state if traffic increases.

In some cases, however, operations at a UE being served by the base station may be affected by panel adaptation. As an example, the UE may receive (e.g., via a downlink control channel, such as a physical downlink control channel (PDCCH)) a configuration for channel state information (CSI) reference signals (CSI-RSs) (e.g., a CSI configuration, a CSI report configuration), based on which the UE may receive and measure one or more CSI-RSs, determine CSI and report CSI feedback. The CSI-RS resources on which the UE receives CSI-RSs and uses to determine CSI may map to antenna panel configurations of the base station. Therefore, as the base station changes active antenna panels and elements, the CSI configuration (and, subsequently, CSI determined by the UE) may change. Accordingly, if the UE is unaware of a CSI configuration that corresponds to an active antenna panel configuration at the base station, the UE may report incorrect or inaccurate CSI feedback.

When a base station transitions an Scell to a dormancy state, a UE operating in the Scell may switch to a dormant bandwidth part (BWP). That is, the UE may stop monitoring a PDDCH of the Scell, but may continue to receive CSI-RS, perform CSI measurements, and report CSI feedback. Accordingly, if the base station performs panel adaptation while the Scell is dormant, the UE may be unable to receive updated CSI configurations in conjunction with the panel adaptation, and the UE may provide inaccurate CSI feedback. Alternatively, if the base station performs panel adaptation while the Scell is active, but refrains from panel adaptation while the Scell is dormant, the UE may not receive an updated CSI configuration before transitioning to the dormancy state. In either case, the base station providing service to the UE may receive inaccurate CSI reports, resulting in suboptimal and less reliable communications.

The techniques described herein support accurate CSI reporting for a UE in a dormant cell, such as an Scell, when a serving base station of the Scell performs dynamic antenna panel adaptation. According to the techniques described herein, a UE may receive, from a base station, control signaling indicating one or more CSI report configurations for the UE to use while in a dormancy state for one or more Scells (i.e., one or more dormant Scells). The CSI report configuration(s) signaled to the UE may indicate or otherwise identify CSI-RS resources that map to one or more antenna panel configurations of the base station, such that the UE, in the dormancy state, may receive one or more CSI-RSs on the CSI-RS resources of the one or more Scells according to the CSI report configuration.

For example, if the base station does not perform dynamic antenna adaptation while an Scell is dormant, the UE may use a CSI report configuration for the dormancy state that was most recently indicated to the UE before the UE transitioned to the dormancy state. Alternatively, the UE may be configured with a specific CSI report configuration to use in the dormancy state, e.g., that is different from an indicated CSI report configuration for an active state of the Scell. In either case, the indicated CSI report configuration may correspond to one or more antenna panel configurations that are active at the base station while the Scell is dormant. The UE may receive CSI-RSs and provide CSI feedback in accordance with the indicated CSI report configuration.

If, instead, the base station performs dynamic antenna adaptation while the Scell is dormant, the UE may be configured to receive control signaling during the dormancy state. In this example, the UE may monitor a PDCCH of the base station to receive an antenna adaptation indication, which may indicate an antenna panel configuration at the base station. In some examples, the UE may receive the antenna adaptation indication as part of DCI, a media access control (MAC) control element (MAC-CE), during a monitoring occasion configured for the antenna adaptation indication, or a combination thereof. The UE may report CSI feedback to the base station based on a CSI report configuration corresponding to the indicated antenna panel configuration.

Aspects of the disclosure are initially described in the context of wireless communications systems. Aspects of the disclosure are then illustrated by a dormancy indication procedure and a process flow. Aspects of the disclosure are further illustrated by and described with reference to apparatus diagrams, system diagrams, and flowcharts that relate to dynamic antenna adaptation in secondary cell dormancy.

FIG. 1 illustrates an example of a wireless communications system 100 that supports dynamic antenna adaptation in secondary cell dormancy in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). The base station may categorize each cell to be a primary cell (Pcell) or a secondary cell (Scell). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and a base station 105 may communicate over a communication link 125. In some implementations, the UE 115 may perform one or more channel measurements of the communication link 125 between the UE 115 and the base station 105 to determine a channel quality associated with the communication link 125. For instance, the base station 105 may transmit one or more CSI-RSs to the UE 115 for the UE 115 to use in determining a channel estimate that is used to assist in link adaptation. The UE 115 may perform one or more channel measurements (e.g., CSI measurements) based on the one or more received CSI-RSs and may transmit a CSI report to the base station 105. Based on the CSI report, the UE 115, the base station 105, or both, may adapt transmission parameters to maintain a reliable communication link between the UE 115 and the base station 105.

In some examples, the CSI report may include one or more parameters based on the CSI measurements. For instance, the CSI report may include one or more precoding matrix indicators (PMIs), rank indicators (RIs), layer indicators (LIs), channel quality indicators (CQIs), reference signal received power (RSRP) measurements (e.g., Layer 1-RSRPs (L1-RSRPs)), signal to interference plus noise (SINR) measurements (e.g., L1-SINRs), or the like. In some examples, the UE 115 may perform periodic CSI reporting (e.g., the base station 105 may transmit higher layer signaling scheduling periodic CSI reports), aperiodic CSI reporting (e.g., the base station 105 may dynamically configure a CSI report), semi-persistent CSI reporting (e.g., the base station 105 may transmit higher layer signaling scheduling periodic CSI reports and may use dynamic signaling to trigger the periodic CSI reporting), or a combination thereof.

In some examples, the base station 105 may configure a set of CSI measurement resources, such as CSI-RS resources, and the UE 115 may perform the one or more channel measurements over one or more of the configured set of CSI measurement resources. For example, the base station 105 may transmit control signaling, such as a radio resource control (RRC) message, that indicates a CSI report configuration. The CSI report configuration may indicate the configured set of CSI measurement resources, as well as any other resource settings that the UE 115 may select and use to generate a CSI report based on channel and interference measurements performed in accordance with the selected resource setting. For example, the UE 115 may receive the control signaling including the CSI report configuration, which may link to one or more resource settings associated with different measurement types. The CSI report configuration may link to a setting for one or more of a non-zero power (NZP) CSI-RS resource for channel measurement (CMR), a CSI-RS resource for interference measurement (CSI-IM), or an NZP CSI-RS for interference measurement (NZP IMR), or any combination thereof. Each resource setting of the one or more resource settings to which the CSI report configuration links may be associated with multiple resources sets, but one active resource set (for example, one active resource set). The UE 115 may select one or more resources from a resource set to use for reporting the CSI. In some cases, the UE 115 may include, in the CSI report, a resource indicator (e.g., a CRI) associated with the selected one or more resources; in this manner, the base station 105 may be informed of the correspondence between the selected resource and the reported CSI.

In some examples of the wireless communications system 100, the base station 105, the UE 115, or both, may be configured with multiple antennas, which may be used to employ techniques such as transmit diversity, receive diversity, MIMO communications, or beamforming, or any combination thereof. For example, in MIMO operations, a device may transmit and receive multiple signals using different spatial layers based on one or more antenna ports of an antenna panel. As another example, multiple antennas may enable full duplex communications, where a device may transmit and receive simultaneously (e.g., in a same time frame); in sub-band full duplex communications, for instance, both uplink and downlink transmissions may share a same time resource (e.g., and different frequency resources). MIMO and full duplex communications may increase throughput and reduce latency in the wireless communications system 100.

The antennas of the base station 105 and the UE 115 may be located within one or more antenna arrays or antenna panels arranged in an antenna configuration 155 and may be collocated. For example, the antenna configuration 155 may include a quantity $N_g$ of antenna panels. Each antenna panel may include a number of antenna elements arranged in a configuration ($N_1$, $N_2$), where $N_1$ refers to a number of antenna elements in the horizontal dimension and $N_2$ refers to a number of antenna elements in the vertical dimension. As illustrated in FIG. 1, the antenna configuration 155 includes four (4) antenna panels, where each antenna panel includes two antenna elements in the horizontal dimension and two antenna elements in the vertical dimension for a total of four antenna elements per antenna panel. The antenna panel configuration 155 may include a set of antenna panels, where each antenna panel includes a number of antenna elements in a horizontal dimension N1 and a vertical dimension N2. It is noted that the dimensions of the antenna panel configuration are provided for illustrative purposes and should not be considered limiting, as antenna arrays having different sizes, configurations, and/or dimensions are also possible.

An antenna panel may support radio frequency beamforming for a signal transmitted via one or more antenna ports. The base station 105 and the UE 115 may thus be configured to support beamformed communications using multiple antenna ports. For example, the base station 105 may transmit the one or more CSI-RSs using one or more CSI-RS-specific antenna ports, which may be referred to as CSI-RS ports. The quantity of CSI-RS ports supported by an antenna panel may be based on the quantity and configuration of antenna elements, and the total quantity of CSI-RS ports for an antenna configuration 155 may further depend on the total number of antenna panels. The total quantity of CSI-RS ports for the antenna configuration 155 may be determined by $2N_gN_1N_2$, in the example of FIG. 1, the total quantity of CSI-RS ports is 2*4*2*2=32.

Additionally, the quantity and configuration of antenna panels, and the corresponding quantity of CSI-RS ports, may determine one or more parameters indicated in a CSI report by the UE 115 to the base station 105. For example, the UE 115 may report a PMI based on the antenna configuration of the base station 105. A PMI may indicate a codebook (e.g., a precoding matrix) preferred by the UE 115 for subsequent communications with the base station 105. The codebook may be of a codebook type (e.g., a type 1 single panel, a type 1 multi-panel, a type 2 single panel, a type 2 port selection, a type 2 enhanced port selection), where each codebook type corresponds to a supported configuration of antenna elements. Table 1 below illustrates examples of supported configurations of antenna elements for type 2 single panel and type 2 port selection codebooks based on $N_1$ and $N_2$, and includes possible codebook oversampling factors ($O_1$, $O_2$) used for PMI computation.

TABLE 1

| Number of CSI-RS antenna ports | ($N_1$, $N_2$) | ($O_1$, $O_2$) |
|---|---|---|
| 4 | (2, 1) | (4, 1) |
| 8 | (2, 2) | (4, 4) |
| | (4, 1) | (4, 1) |
| 12 | (3, 2) | (4, 4) |
| | (6, 1) | (4, 1) |
| 16 | (4, 2) | (4, 4) |
| | (8, 1) | (4, 1) |
| 24 | (4, 3) | (4, 4) |
| | (6, 2) | (4, 4) |
| | (12, 1) | (4, 1) |
| 32 | (4, 4) | (4, 4) |
| | (8, 2) | (4, 4) |
| | (16, 1) | (4, 1) |

Table 2 illustrates examples of supported configurations for type 1 multipanel codebooks based on $N_g$, $N_1$, and $N_2$.

TABLE 2

| Number of CSI-RS antenna ports | ($N_1$, $N_2$) | ($O_1$, $O_2$) |
|---|---|---|
| 8 | (2, 2, 1) | (4, 1) |
| 16 | (2, 4, 1) | (4, 1) |
| | (4, 2, 1) | (4, 1) |
| | (2, 2, 2) | (4, 4) |
| 32 | (2, 8, 1) | (4, 1) |
| | (4, 4, 1) | (4, 1) |
| | (2, 4, 2) | (4, 4) |
| | (4, 2, 2) | (4, 4) |

In one example, the antenna configuration 155 illustrated in FIG. 1 may have a configuration of (2,4,2) and thus be associated with 32 CSI-RS ports.

Base stations 105 in the wireless communications system 100 may have any number of antenna elements and antenna panels. For example, massive MIMO operations may be supported by relatively large numbers of antenna panels. However, as the number of antenna elements increases, power consumption at a base station 105 increases. In some examples, a base station 105 may perform panel adaptation by turning on or off (i.e., activating or deactivating) a subset of antenna panels or subpanels, for example, to reduce such power consumption. For instance, if traffic in a cell served by the base station 105 is relatively low, the base station 105 may deactivate some antenna panels without negatively impacting devices operating in the cell. As another example, the base station 105 may reduce (e.g., deactivate) the number of antenna panels or antenna elements when switching from full duplex communications to half duplex communications, in which uplink and downlink transmissions may be transmitted in different time resources (e.g., instead of a same time resource, as in full duplex communications).

As panel adaptation at a base station 105 changes the configuration of the antenna panels and antenna elements, panel adaptation may modify the number of antenna elements used to transmit and receive signals over a wireless channel, which may in turn impact or otherwise modify communications between the base station 105 and other devices, such as a UE 115. As an example, panel adaptation at the base station 105 may have an impact on CSI feedback by a UE 115, as the antenna panels and antenna elements used to transmit a CSI-RS may affect channel estimation procedures performed at the UE 115. For example, an antenna panel configuration at the base station 105 may correlate to a quantity of CSI-RS ports, which may, in turn, determine CSI parameters to include in CSI feedback (i.e., in a CSI report). The base station 105 may configure CSI-RS resources such that respective CSI-RS resources map to one or more antenna panels at the base station 105 and may indicate a CSI report configuration to the UE 115. The UE 115 may perform CSI procedures based on a quantity of active antenna panels and/or subpanels at the base station 105, e.g., based on the CSI report configuration.

Accordingly, in some examples, the base station 105 may indicate antenna panel configuration information to the UE 115. For instance, the base station 105 may transmit a message (e.g., DCI, MAC-CE) including an antenna adaptation indication to the UE 115; the antenna adaptation indication may indicate an antenna adaptation mode that corresponds to the antenna panel configuration of the base station 105.

However, the UE 115 may not be aware of antenna adaptation implemented by the base station 105 in some scenarios. Additionally, or alternatively, the UE 115 may be unaware of which CSI configuration to use to provide an accurate CSI report. For example, a UE 115 may operate in a dormancy state to reduce power consumption, where the UE 115 refrains from monitoring some channels (e.g., a control channel, such as a PDCCH). Without control channel monitoring, the UE 115 may not receive information related to the antenna panel adaptation (e.g., an antenna adaptation indication). Without antenna panel adaptation information, the UE 115 may be unaware of a corresponding CSI report configuration to use. That is, the UE 115 may be unaware of CSI-RS resources to monitor for CSI-RS, may select incorrect or suboptimal CSI parameters (such as PMI) for the CSI report, or the like.

For example, a UE 115 may be served by a base station 105 in a primary cell (Pcell), and, additionally or alternatively, one or more Scells. The base station 105 may control (e.g., via DCI) a dormancy state at each Scell based on the communications at the Scell. For example, the base station 105 may transition each Scell to a dormancy state when there is relatively little or no traffic associated with the Scell. Additionally or alternatively, the base station 105 may transition each Scell to a non-dormancy state (i.e., an active state) when there is a relatively high traffic load at the Scell. In some examples, the Scell may switch to a dormant BWP (e.g., when the Scell is dormant) or a non-dormant BWP (e.g., when the Scell is non-dormant, active).

The UE 115 may receive a dormancy indication (e.g., an Scell dormancy indication), for instance, as part of DCI, indicating that the UE 115 is to transition to the dormancy state in the Scell. In some examples, the UE 115 may switch to the dormant BWP. A UE 115 operating in a dormant Scell may not perform uplink communications, may not monitor a PDCCH, or the like, to conserve power. In some cases, the Scell may support dynamic antenna panel adaptation while the UE 115 is in the dormancy state on the Scell. As the UE 115 does not monitor a PDCCH in the dormancy state, the UE 115 may be unable to receive antenna panel adaptation information pertaining to the base station 105. Additionally, or alternatively, the UE 115 may be unable to receive CSI report configurations corresponding to antenna panel configurations at the base station 105, which may change over time. That is, the base station 105 may modify or change an antenna configuration such that the CSI procedures performed by the UE 115 are no longer accurate, as the UE 115 is not aware of the antenna panel adaptation and does not receive a corresponding CSI report configuration.

As another example, the base station 105 may not perform antenna panel adaptation when the Scell is dormant, but may do so when the Scell is active. If the UE 115 fails to receive (e.g., before the UE 115 enters the dormancy state) a CSI report configuration for the current antenna panel configuration of the base station 105, the UE 115 may be forced to perform CSI procedures using an outdated CSI report configuration (e.g., corresponding to an antenna panel configuration different than that of the base station 105). As such, information included in the CSI feedback may not correlate to the antenna panel configuration at the base station 105. That is, the CSI reported by the UE 115 may not provide information with enough granularity (e.g., on a per-panel or per-subpanel basis) for modifying communications parameters and link adaptation based on a number of active and non-active antenna panels at the base station 105.

The techniques described herein support accurate CSI reporting and procedures for a UE 115 in a dormant Scell, when a base station 105 of the Scell supports antenna panel adaptation. The UE 115 may receive, from the base station 105, control signaling (e.g., DCI) indicating one or more CSI report configurations for the UE 115 to use while in a dormancy state for one or more Scells (i.e., one or more dormant Scells). The CSI report configuration(s) signaled to the UE 115 may indicate or otherwise identify CSI-RS resources that map to one or more antenna panel configurations of the base station. The UE 115, in the dormancy state, may receive one or more CSI-RSs on the CSI-RS resources of the one or more Scells according to the CSI report configuration. Based on performing measurements associated with the CSI-RSs, the UE 115 may generate and report CSI feedback to the base station 105.

In some examples, the UE 115 may be configured to receive control signaling during the dormancy state. The UE 115 may monitor a PDCCH of the base station 105 to receive an antenna adaptation indication, which may indicate an antenna panel configuration at the base station 105. Additionally, or alternatively, the UE 115 may receive, via the PDCCH, scheduling information for a downlink shared channel (e.g., a physical downlink shared channel (PDSCH)), and may receive the antenna adaptation indication via the downlink shared channel based on the scheduling information. In some examples, the UE 115 may receive the antenna adaptation indication as part of DCI, MAC-CE, during a monitoring occasion configured for the antenna adaptation indication, or the like. The UE 115 may report CSI feedback to the base station based on the antenna adaptation indication, e.g., based on a CSI report configuration corresponding to and indicated antenna panel configuration.

In some cases, the UE 115 may receive the control signaling prior to entering the dormancy state, such that the UE 115 may perform CSI procedures based on the CSI report configuration that was most recently indicated to the UE 115 before entering the dormancy state. In some examples, the UE 115 may be configured with a CSI report configuration dedicated for use in the dormancy state, e.g., that is different from an indicated CSI report configuration for an active state of the Scell. The UE may receive CSI-RSs and provide CSI feedback in accordance with the indicated CSI report configuration.

Figure 2:
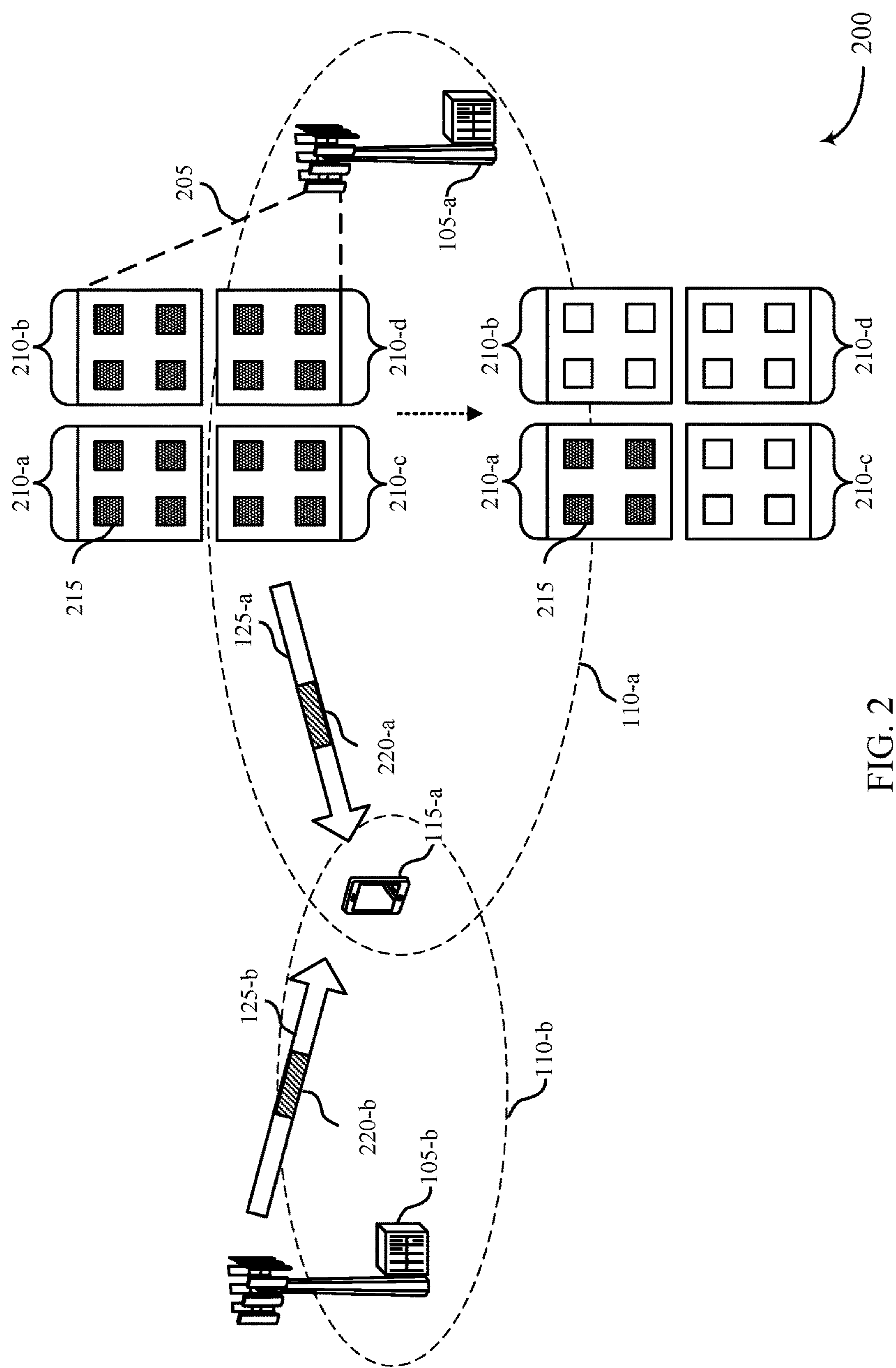

FIG. 2 illustrates an example of a wireless communications system 200 that supports dynamic antenna adaptation in Scell dormancy in accordance with aspects of the present disclosure. For instance, wireless communications system 200 includes a UE 115-*a*, a base station 105-*a*, and a base station 105-*b*, which may be examples of the corresponding devices described with reference to FIG. 1. Additionally or alternatively, the UE 115-*a* may be an example of a CPE, a relay node, a repeater, a router, an IAB node, or the like. Similarly, the base station 105-*a* and/or the base station 105-*b* may be an example of a backhaul node, an IAB node, or the like. Thus, although aspects of the present disclosure are described with reference to a UE 115 and base stations 105, it is understood that the described techniques may be performed by a wireless device different from a UE 115 and base stations 105. Stated another way, operations performed by the UE 115-*a* and the base stations 105 may be respectively performed by a UE 115, a base station 105, or another wireless device, and the example shown should not be construed as limiting.

The UE 115-*a* may communicate with the base stations 105-*a* and 105-*b* via communication links 125-*a* and 125-*b*, respectively. For example, the base station 105-*b* may serve the UE 115-*a* via a cell 110-*b* and the base station 105-*a* may serve the UE 115-*a* via a cell 110-*a*. In some examples, the cell 110-*b* may be an example of a Pcell and the cell 110-*a* may be an example of an Scell. The base stations 105 and the UE 115-*a* may be configured with multiple antennas located within one or more antenna arrays or antenna panels.

As illustrated in FIG. 2, the base station 105-*a* includes multiple antenna elements 215 arranged in an antenna panel configuration 205 that includes, for example, four antenna panels 210-*a*, 210-*b*, 210-*c* and 210-*d*. Each antenna panel 210-*a*, 210-*b*, 210-*c* and 210-*d* may include multiple antenna elements 215. The base station 105-*a* may transmit and receive downlink and uplink transmissions using the antenna panels 210, for example, via full duplex and/or MIMO communications. As an example, the base station 105-*a* may transmit and receive multiple signals using different spatial layers based on one or more antenna ports associated with antenna elements 215. In some cases, each data stream may be referred to as a MIMO layer, where the number of MIMO layers for MIMO communications may be based on the number of transmit and receive antennas.

In the wireless communications system 200, the UE 115-*a* may perform channel and interference measurements to maintain or improve the communication links 125 with the respective base stations 105. For instance, the UE 115-*a* may receive a CSI report configuration 220-*a* from the base station 105-*a* and a CSI report configuration 220-*b* from the base station 105-*b*. The CSI report configurations 220 may include information for the UE 115-*a* to use in determining and reporting CSI, such as CSI report timing, quantities to measure, codebooks to use, and/or TCI state and antenna panel configuration information (e.g., associated with the corresponding base station 105), among other examples. The base station 105-*a* may transmit one or more CSI-RSs over one or more CSI-RS resources (e.g., CMRs) to the UE 115-*a* via the communication link 125-*a* and in accordance with the CSI report configuration 220-*a*. The UE 115-*a* may perform measurements based on the received CSI-RSs and generate CSI based on the measurements. The UE 115-*a* may transmit a CSI report including CSI feedback to the base station 105-*a*, which may allow the base station 105-*a* to perform link adaptation procedures and optimize communications parameters for the communication link 125-*a*.

While having multiple antenna elements 215 and multiple antenna panels 210 may enable the UE 115-*a* to utilize various communications schemes, such as SBFD, MIMO, or other examples, the power consumed by the base station 105-*a* may increase as the quantity of antenna panels 210 and antenna elements 215 increases. For instance, each antenna element 215 may be linked with an RF chain that may include power amplifiers (PAs), low noise amplifiers (LNAs), and other RF components. Each component, and each RF chain, may consume relatively large amounts of power. Accordingly, in some cases, the base station 105-*a* may perform dynamic antenna adaptation by dynamically turn off (e.g., deactivate, power down) one or more antenna panels 210 and/or one or more subpanels of one or more of the antenna panels 210 to conserve power and increase energy efficiency.

For instance, when there is low traffic/activity in a cell served by the base station 105-*a*, the base station 105-*a* may switch from full duplex communications to half duplex communications, and the base station 105-*a* may operate with fewer overall antenna panels 210 when using half duplex communications. In other examples, the base station 105-*a* may reduce a number of MIMO layers used, which may enable the base station 105-*a* to deactivate some antenna panels 210. However, deactivating antenna panels 210 may impact CSI procedures at the UE 115-*a*. For instance, a number of CSI-RS ports associated with a CSI-RS may be mapped to physical antennas of the antenna panels 210 and antenna elements 215 at the base station 105-*a*. Further, codebooks used by the base station 105-*a* and the UE 115-*a* may be based on the number of CSI-RS ports. Thus, changing the configuration of the antenna panels 210 may change the number of available CSI-RS ports and the associated codebooks, among other impacts.

Accordingly, the base station 105-*a* may configure CSI-RS resources such that respective CSI-RS resources map to one or more antenna elements 215, antenna panels 210, or a combination thereof. The base station 105-*a* may transmit a CSI report configuration 220-*a* (e.g., CSI-reportConfig) to the UE 115-*a* which may include an indication of a mapping between CSI-RS resources (e.g., or CSI-RS ports) and one or more of the antenna panels 210. This configuration may facilitate transitions during panel adaptation, as the UE 115-*a* may adaptively perform CSI procedures for different antenna panel configurations. The UE 115-*a* may receive the CSI report configuration 220-*a* as well as one or more CSI-RSs and may perform channel estimation measurements, based on which the UE 115-*a* may generate and report CSI feedback to the base station 105-*a*.

To further reduce power consumption, a base station 105 may transition a cell 110 to a dormant (i.e., inactive) state. For instance, the base station 105-*a* may switch the cell 110-*a* (e.g., an Scell) to a dormancy state; to reduce power consumption at the UE 115-*a*, the UE 115-*a* may transition to operating in a dormancy state on the cell 110-*a*, for instance, by switching to a dormant BWP. However, when one or more cells (e.g., Scells) at the base station 105-*a* are dormant, the UE 115-*a* may not be able to obtain the CSI report configuration 220-*a* and may be unable to perform accurate CSI procedures, especially when the base station 105-*a* supports antenna panel adaptation. For example, as illustrated in FIG. 2, the base station 105-*a* may modify or change the antenna configuration 210 such that the antenna panel 210-*a* remains on while the antenna panel 210-*b*, the antenna panel 210-*c*, and the antenna panel 210-*d* turn off. In the scenario that the UE 115-*a* is operating in a dormancy state on the cell 110-*a*, the UE 115-*a* may not monitor some channels (e.g., a control channel, such as a PDCCH) of the base station 105-*a*, in order to reduce power consumption at the UE 115-*a*. Consequently, the UE 115-*a* may not know that the antenna panels 210-*b*, 210-*c*, and 210-*d* are no longer active. Accordingly, the CSI procedures performed by the UE 115-*a* may no longer be accurate.

The methods and techniques described herein support dynamic antenna adaptation at a base station 105 for Scell dormancy. For example, the base station 105-*a* may determine or otherwise identify CSI report configurations 220 that correspond to one or more antenna panel configurations at the base station 105-*a*. In some cases, different antenna panel configurations may correspond to different CSI report configurations 220. For instance, a given CSI report configuration 220 may indicate or otherwise identify one or more CSI-RS resources mapped to one or more antenna panel configurations; the UE 115-*a* may receive, in the dormancy state, one or more CSI-RSs on the one or more CSI-RS resources. Additionally, or alternatively, the base station 105-*a* may transmit, to the UE 115-*a*, a message (e.g., DCI, MAC-CE) including an antenna adaptation indication, which may indicate information about one or more antenna panel configurations at the base station 105-*a*. In some cases, the antenna adaptation indication may indicate an antenna adaptation mode that corresponds to an antenna panel configuration of the base station 105-*a*. Accordingly, the UE 115-*a* may receive CSI-RS on CSI resources, generate CSI feedback, and transmit a CSI report (e.g., based on measurements associated with the CSI-RS) in accordance with a CSI report configuration 220 that corresponds to the indicated antenna adaptation mode (e.g., antenna panel configuration).

Further, a CSI report configuration 220 may correspond to a dormancy state or an active state for the cell 110-*a*; here, a CSI report configuration 220 for use in a dormancy state may be different than a CSI report configuration 220 for use in an active state. For example, the identified CSI-RS resources may be indicated for use in a dormancy state for one or more Scells, e.g., including the cell 110-*a*. Accordingly, the UE 115-*a* operating in a dormancy state on the cell 110-*a* may obtain the CSI report configuration 220-*a* whether the base station 105-*a* enables or does not enable dynamic antenna adaptation when the cell 110-*a* is dormant. For example, the base station 105-*a* may perform dynamic antenna adaptation when the cell 110-*a* is active, but may refrain from performing dynamic antenna adaptation when the cell 110-*a* is dormant. In such examples, the base station 105-*a* may transmit the CSI report configuration 220-*a* corresponding to an antenna panel configuration at the base station 105-*a*, e.g., based on the dynamic antenna adaptation. The UE 115-*a* may receive the CSI report configuration 220-*a* (e.g., while in the active state); when the UE 115-*a* switches to the dormancy state, the UE 115-*a* may perform CSI procedures (e.g., receive CSI-RSs, generate and report CSI feedback) in accordance with the CSI report configuration 220-*a*.

The CSI report configuration 220-*a* may, in some cases, correspond to a most recently configured antenna panel configuration. In some cases, the UE 115-*a* may be configured (e.g., preconfigured) with a CSI report configuration 220-*a* for use in the dormancy state. For instance, the UE 115-*a* may receive (e.g., while in the active state) control signaling, such as radio resource control (RRC) signaling, indicating the CSI report configuration 220-*a*. Alternatively, the base station 105-*a* may dynamically indicate the CSI report configuration 220-*a*, e.g., before the UE 115-*a* transitions to the dormancy state (e.g., switches to the dormant BWP).

In some examples, the UE 115-*a* may be configured to receive control signaling during the dormancy state. Here, the UE 115-*a* may receive a configuration indicating a set of parameters for monitoring PDCCH in the dormancy state. For example, the UE 115-*a* may be configured with a periodicity, a quantity of blind decodes, one or more monitoring occasions, a control resource set (CORESET) configuration, a set of resources, a search space, a DCI type (i.e., format), or the like, among other examples, for PDCCH monitoring in the dormancy state.

In some examples, the PDCCH monitoring configuration may enable the UE 115-*a* to receive an antenna adaptation indication while in the dormancy state. For instance, the UE 115-*a* may monitor the PDCCH and receive the antenna adaptation indication during a monitoring occasion of the PDCCH configured for receiving the antenna adaptation indication. Additionally, or alternatively, the UE 115-*a* may receive, based on monitoring the PDCCH, scheduling information for a downlink shared channel (e.g., a PDSCH), and may receive a message including the antenna adaptation indication via the PDSCH based on the scheduling information. In some examples, the UE 115-*a* may receive the antenna adaptation indication as part of DCI, MAC-CE, or the like. The UE 115-*a* may report CSI feedback to the base station 105-*a* based on the antenna adaptation indication, e.g., based on a CSI report configuration corresponding to an indicated antenna panel configuration.

Figure 3:
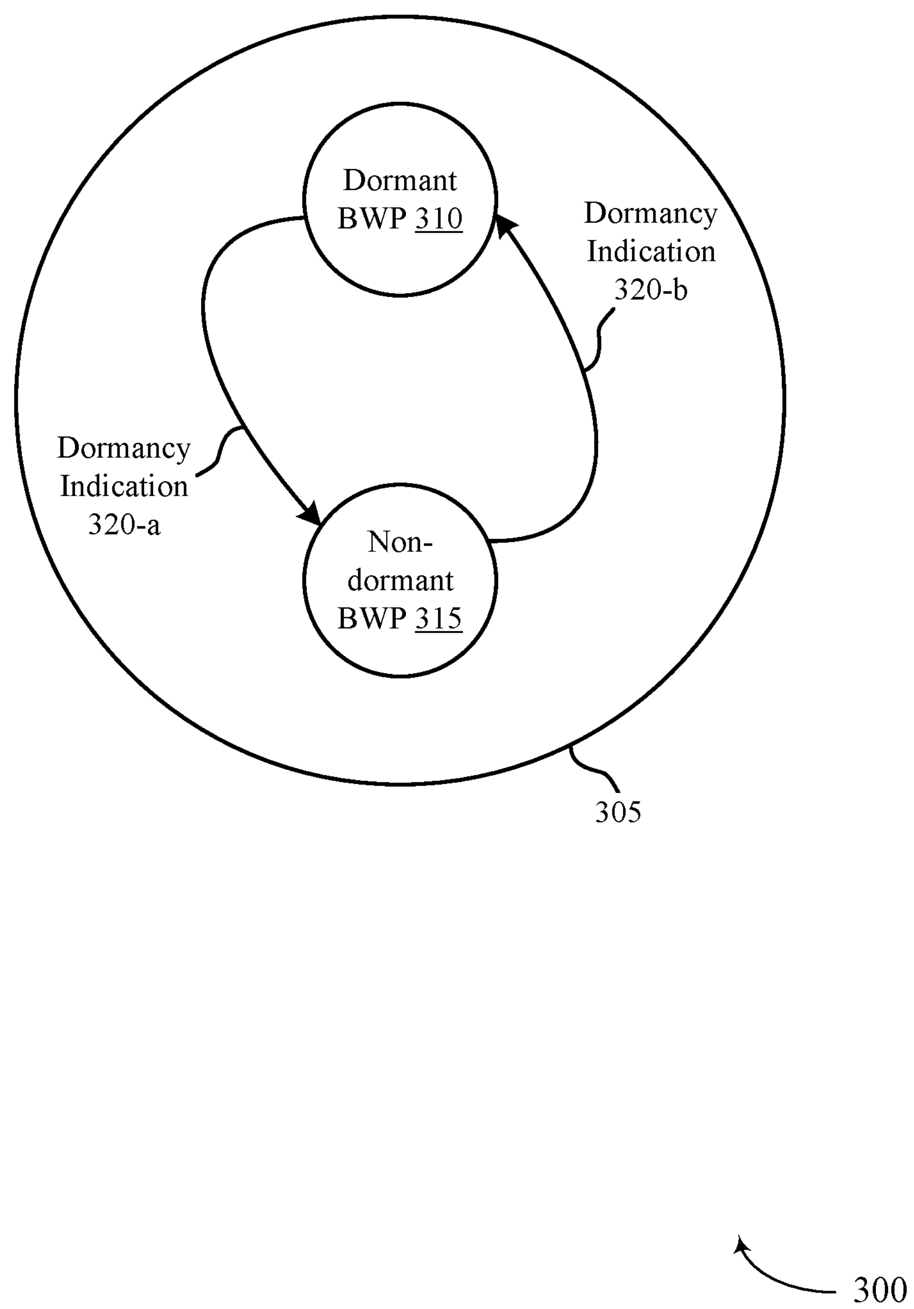
FIG. 3 illustrates an example of a dormancy indication procedure that supports dynamic antenna adaptation in Scell dormancy in accordance with aspects of the present disclosure.

FIG. 3 illustrates an example of a dormancy indication procedure 300 that supports dynamic antenna adaptation in secondary cell dormancy in accordance with aspects of the present disclosure. In some examples, the dormancy indication procedure 300 may implement aspects of wireless communications system 100 and wireless communications system 200. For example, the dormancy indication procedure 300 may be implemented by a UE 115 and a base station 105 as described with reference to FIGS. 1 and 2. In some cases, a base station, a UE, or both, may perform a dormancy switching operation for an Scell based on the dormancy indication procedure 300. For example, the base station, the UE, or both, may switch between a dormant BWP 310 (e.g., inactive frequency resources) and a non-dormant BWP 3115 (e.g., active frequency resources).

In some cases, a base station may schedule communications for a UE over a Pcell and one or more Scells. The base station may control a dormancy state at each Scell based on the communications at the Scell. In some examples, the Scell may be in a deactivated state in which a carrier frequency for Scell is not being used by one or more wireless devices, such as the base station, the UE, or the like. The base station may activate the Scell to communicate with the UE. While the Scell is in the activated state 305, the UE may transmit or receive signaling via one or more non-dormant BWPs 315 or may monitor one or more non-dormant BWPs 315. The one or more non-dormant BWPs 315 may include active frequency resources for Scell the base station is using to communicate.

In some examples, the base station may switch the dormancy state of an Scell within an activated state 305, for instance, by performing the Scell dormancy procedure 300 to transition the Scell to or from a dormancy state. For example, the power consumption may be lower at the UE if the Scell switches to a dormant BWP 310 than if the Scell is operating using a non-dormant BWP 315. The base station may transmit dormancy indications 320, which may be examples of DCI messages, to the UE to indicate the state of the Scell, the BWP to use, or both. For example, the base station may transmit a dormancy indication 320-*a* to the UE to transition the UE to the non-dormant BWP 315, or may transmit a dormancy indication 320-*b* to transition the UE to the dormant BWP 310. Further, in some examples, the Scell may transition into dormancy in combination with the base station performing dynamic antenna adaptation.

In some cases, while using the dormant BWP 310, the Scell may not be available for control channel monitoring (e.g., PDCCH monitoring), some CSI measurements or reports (e.g., aperiodic-CSI (A-CSI)), reference signal transmission (e.g., sounding reference signal (SRS) transmission), uplink data transmissions, or the like. Once the base station, the UE, or both, switch the Scell back to the non-dormant BWP 315, the Scell may be available for monitoring and for signaling using one or more active frequency resources on the carrier frequency for Scell.

In accordance with the techniques described herein, the UE, operating in the dormancy state for the Scell (e.g., using the dormant BWP 310), may perform CSI procedures based on a CSI report configuration for the dormancy state for the Scell. For example, the UE may dynamically receive an indication of a CSI report configuration for use in the dormancy state before transitioning to the dormant BWP 310 on the Scell. In some examples, the CSI report configuration may be a most recently indicated CSI report configuration, e.g., may be associated with a most recently used antenna panel configuration of the base station. For example, if the base station used a configuration including 16 antenna elements arranged in a four-by-four antenna array before transmitting the dormancy indication 320-*b*, the UE may receive, in the dormancy state, CSI-RS(s) on CSI resources associated with the 16 antenna element configuration. In some cases, the UE may determine that the CSI report configuration is the most recently indicated CSI report configuration based on receiving one or more CSI-RSs on one or more resources. For instance, the UE may receive a first CSI-RS according to a first CSI resource based on determining that the first CSI resource is a most recently configured CSI resource among a set of CSI resources.

The UE may, in some examples, be configured with a CSI report configuration dedicated for use in the dormancy state. That is, rather than dynamically receiving a CSI report configuration before the Scell transitions to dormancy, the UE may receive, as part of the dormancy indication 320-*b* (which may be a DCI message), an indication of the CSI report configuration for the dormancy state. Here, the CSI report configuration for the dormancy state may be different than a second CSI report configuration for use in the active state for the one or more Scells.

As a specific example, the UE may perform CSI procedures according to the second CSI report configuration while operating in the active state for the Scell. That is, the UE may receive CSI-RSs and transmit CSI feedback via the non-dormant BWP 315. The UE may receive the dormancy indication 320-*b*, which may include an indication of the CSI report configuration for the dormancy state, and may switch to the dormant BWP 310. The UE may perform CSI procedures (e.g., receive CSI-RSs, transmit CSI feedback) via the dormant BWP 310 in accordance with the CSI report configuration for the dormancy state.

In some cases, the base station may perform dynamic antenna adaptation while the Scell is in the dormant state (e.g., uses the dormant BWP 310). In some examples, the UE may monitor a PDCCH of the dormant BWP 310 to receive an indication of the antenna panel configuration at the base station (i.e., an antenna panel indication). Alternatively, the UE may monitor the PDCCH to receive scheduling information for a PDSCH and may receive the antenna panel indication via the PDSCH based on the scheduling information. For example, the UE may monitor the PDCCH for a DCI which may schedule the PDSCH. Accordingly, the UE may receive CSI-RS(s), perform CSI measurements, and report CSI feedback based on the CSI configuration(s) corresponding to the indicated antenna panel configurations.

Figure 4:
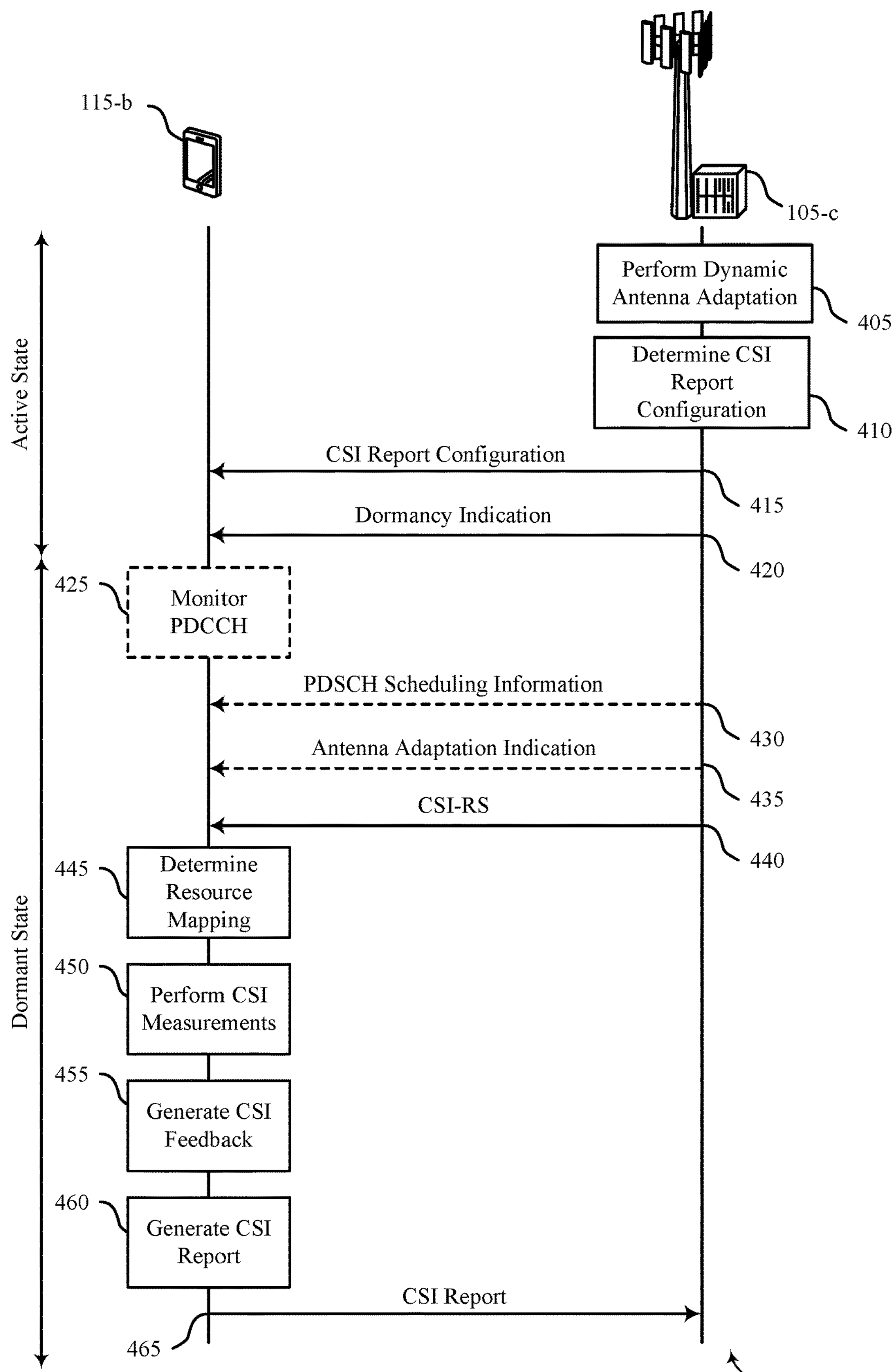
FIG. 4 illustrates an example of a process flow that supports dynamic antenna adaptation in Scell dormancy in accordance with aspects of the present disclosure.

FIG. 4 illustrates an example of a process flow 400 that supports dynamic antenna adaptation in secondary cell dormancy in accordance with aspects of the present disclosure. In some examples, process flow 400 may implement aspects of wireless communications systems 100 and 200. For example, process flow 400 includes a UE 115-*b* and a base station 115-*c*, which may be examples of the corresponding devices described herein. Additionally, the operations in process flow 400 performed by the UE 115-*b* and the base station 105-*c* may be respectively performed by a UE 115, a base station 105, or another wireless device, and the example shown should not be construed as limiting.

In the process flow 400, the base station 105-*c* may have one or more antenna panels each including multiple antenna elements. In some examples, the one or more antenna panels may be divided into one or more subpanels. For instance, the base station 105-*c* may have four antenna panels, or may have one antenna panel divided into four subpanels. The base station 105-*c* may provide service to the UE 115-*b* via one or more Scells and may transition the one or more Scells between an active state and a dormancy state. In the example of FIG. 2, the one or more Scells may be active for 405 through 420 and dormant for 425 through 465.

At 405, the base station 105-*c* may perform dynamic antenna adaptation by turning off or on some antenna panels or antenna elements, or otherwise modifying an antenna panel configuration, e.g., as described with reference to FIG. 2.

At 410, the base station 105-*c* may determine a CSI report configuration, where the CSI report configuration indicates a mapping between at least one antenna panel configuration of the base station 105-*c* and one or more CSI-RS resources (e.g., one or more sets of CSI-RS resources) for use in a dormancy state on the one or more Scells. The one or more CSI-RS resources may correspond to a set of antenna panels of the base station, a set of subpanels of an antenna panel of the base station, or some combination thereof. For example, the base station 105-*c* may determine a CSI report configuration where the configuration indicates a mapping between a CSI-RS resource (e.g., of the one or more CSI-RS resources) and multiple antennas of the base station 105-*c*. Additionally or alternatively, the base station 105-*c* may determine a mapping between a CSI-RS resource and multiple antenna subpanels of an antenna panel of the base station 105-*c*.

At 415, the base station 105-*c* may transmit, and the UE 115-*b* may receive, signaling indicating the CSI report configuration. The CSI report configuration may, in some examples, indicate the mapping determined at 410. In some cases, the CSI report configuration for use in the dormancy state may be different than a second CSI report configuration for use in an active state for the one or more Scells.

At 420, the base station 105-*c* may transmit, and the UE 115-*b* may receive, signaling indicating a dormancy indication (i.e., an indication to transition to the dormancy state for the one or more Scells). In some examples, the signaling at 415 and the signaling at 420 may be a same signaling. That is, the signaling indicating the CSI report configuration may be DCI that further includes the dormancy indication. The UE 115-*a* may transition to the dormancy state on the Scell based on the dormancy indication.

At 425, the UE 115-*b* may monitor a PDCCH. For example, the UE 115-*b* may monitor the PDCCH in the dormancy state.

At 430, the base station 105-*c* may transmit, and the UE 115-*b* may receive, signaling indicating scheduling information (e.g., DCI) for a PDSCH, e.g., based on monitoring the PDCCH at 425. The scheduling information may be a grant indicating an incoming data transmission to the UE for a MAC-CE, which may contain an indication of the antenna adaptation at the base station.

At 435, the base station 105-*c* may transmit, and the UE 115-*b* may receive, a message (e.g., a DCI message, a MAC-CE message) including an antenna adaptation indication. The antenna adaptation indication may indicate an antenna adaptation mode corresponding to an antenna panel configuration of the base station 105-*c*, e.g., in accordance with the dynamic antenna adaptation performed at 405. In some cases, the UE 115-*b* may receive the antenna adaptation indication based on monitoring the PDCCH at 425, receiving the scheduling information at 430, or a combination thereof. For example, the UE 115-*b* may monitor the PDCCH at 425 and may receive, at 435, the antenna adaptation indication during a monitoring occasion of the PDCCH configured for receiving the antenna adaptation indication. Additionally, or alternatively, at 435, the UE 115-*b* may receive a message including the antenna adaptation indication via a PDSCH in accordance with the scheduling information received at 430. In this example, the message may be a MAC-CE.

At 440, the base station 105-*c* may transmit, and the UE 115-*b* may receive in the dormancy state, the one or more CSI-RSs on the one or more CSI-RS resources of the one or more Scells, e.g., in accordance with the CSI report configuration. For example, the base station 105-*c* may transmit, and the UE 115-*b* may receive, a first CSI-RS according to a first CSI resource based on determining that the first CSI resource is a most recently configured CSI resource from a set of CSI resources.

At 445, the UE 115-*b* may determine one or more resource mappings, e.g., based on the CSI report configuration. For instance, the UE 115-*b* may determine a mapping between respective CSI-RS resources and respective antenna panels of the base station 105-*c*. As a specific example, a first CSI-RS resource may be mapped to a first antenna panel and a second CSI-RS resource may be mapped to a second antenna panel. Alternatively, the first CSI-RS resource may be mapped to multiple antenna panels. In some examples, the UE 115-*b* may determine a mapping between a CSI-RS resource and multiple subpanels of an antenna panel.

At 450, the UE 115-*b* may perform CSI measurements on the one or more CSI-RSs (e.g., received at 440) using the respective CSI-RS resources in accordance with the CSI report configuration (e.g., received at 415).

At 455, the UE 115-*b* may generate CSI feedback in accordance with the CSI report configuration received at 415 and based on the measurements performed at 450, e.g., associated with the one or more CSI-RSs received at 440. In some cases, the UE 115-*b* may generate CSI feedback based on the resource mapping determined at 445. For example, the UE 115-*b* may generate CSI feedback based on one or more respective CSI-RS resources being mapped to one or more respective antenna panels or subpanels (e.g., as determined at 445), CSI measurements (e.g., as determined at 450) on one or more CSI-RSs received at 440, or the like.

At 460, the UE 115-*b* may generate one or more CSI reports including the CSI feedback generated at 455, e.g., based on measurements associated with the one or more CSI-RSs received at 440.

At 465, the UE 115-*b* may transmit, and the base station 105-*c* may receive, the one or more CSI reports generated at 460. That is, the UE 115-*b* may transmit a message reporting the CSI feedback generated at 455 (e.g., based on the measurements associated with the CSI-RSs received at 440). In some examples, the UE 115-*b* may transmit the message reporting the CSI feedback based on (i.e., in accordance with) the antenna adaptation indication received at 435, the dormancy indication at 420, or a combination thereof.

Figure 5:
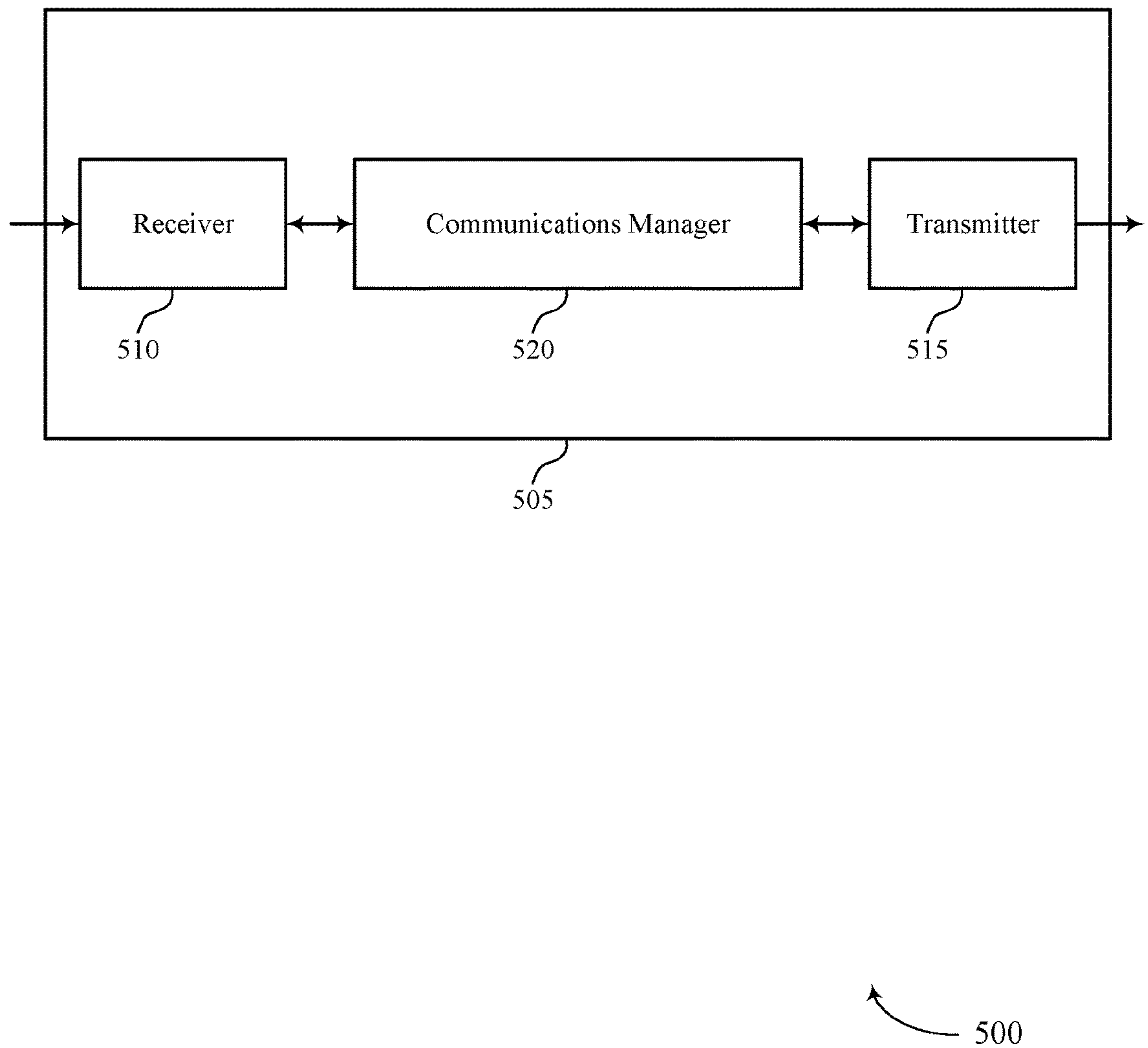
FIGS. 5 and 6 show block diagrams of devices that support dynamic antenna adaptation in Scell dormancy in accordance with aspects of the present disclosure.

FIG. 5 shows a block diagram 500 of a device 505 that supports dynamic antenna adaptation in Scell dormancy in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the antenna adaptation features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic antenna adaptation in Scell dormancy). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic antenna adaptation in Scell dormancy). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic antenna adaptation in S cell dormancy as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, signaling indicating a CSI report configuration that indicates CSI-RS resources for use in a dormancy state for one or more Scells, where the CSI-RS resources are mapped to at least one antenna panel configuration of the base station. The communications manager 520 may be configured as or otherwise support a means for receiving, in the dormancy state, one or more CSI-RSs on the CSI-RS resources of the one or more Scells according to the CSI report configuration. The communications manager 520 may be configured as or otherwise support a means for transmitting, to the base station, a message reporting CSI feedback based on measurements associated with the received one or more CSI-RSs.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reporting CSI associated with antenna panels or subpanels of a base station using dynamic antenna adaptation while serving an Scell that may be dormant. For example, the device 505 may generate and report CSI to the base station in a dormant Scell based on an indicated CSI report configuration that includes a mapping between CSI-RS resources and antenna panels or subpanels of the base station in the dormant Scell, thereby increasing the efficacy and accuracy of the CSI report. Put another way, generating a CSI report at increasing levels of granularity whether or not the dormant Scell supports dynamic antenna adaptation at the base station enables the device 505 to provide CSI feedback that represents the channel with relatively increased accuracy. The device 505 may therefore select appropriate communications parameters, which may in turn reduce power consumption and increase communications efficiency at the device 505.

Figure 6:
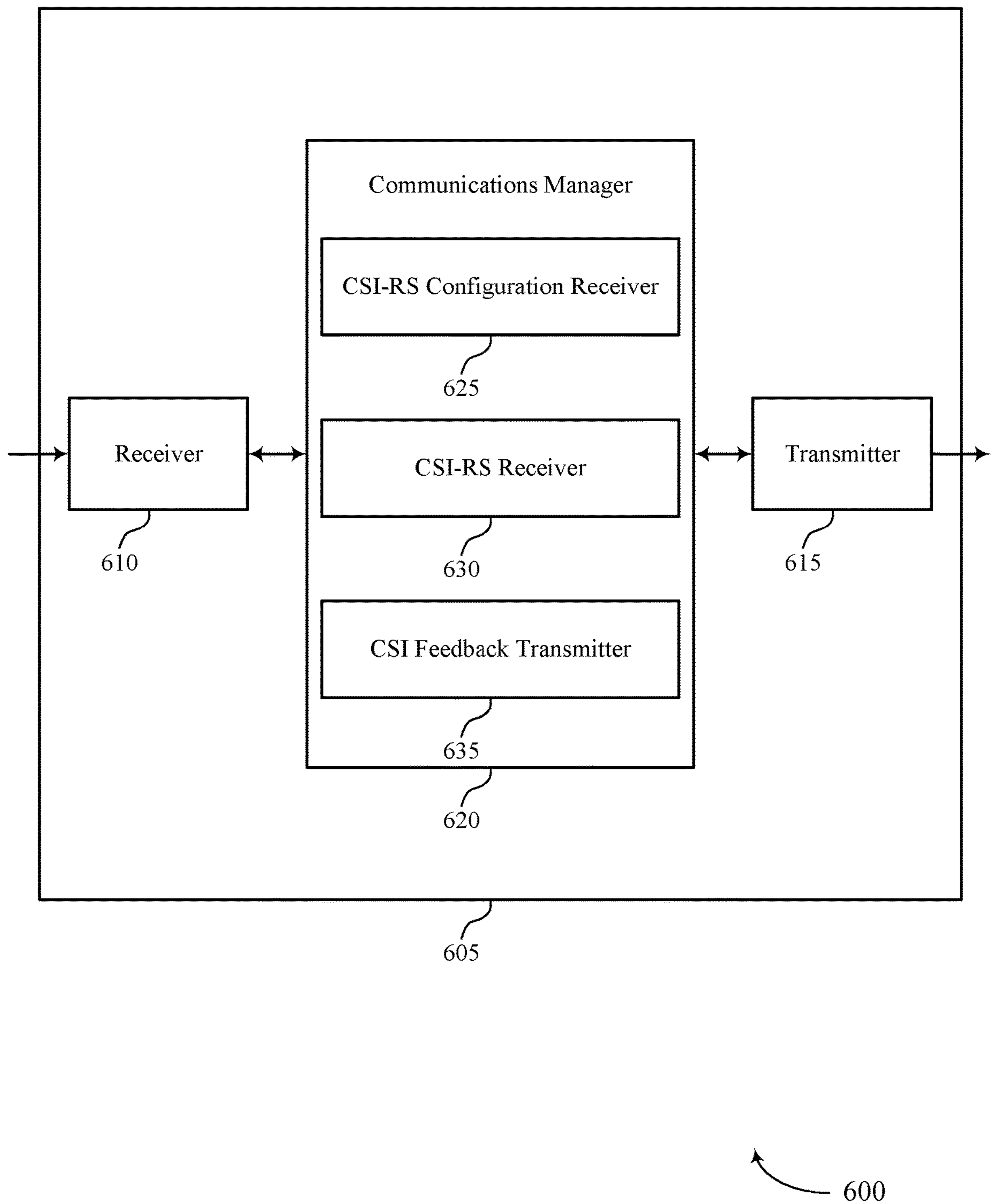

FIG. 6 shows a block diagram 600 of a device 605 that supports dynamic antenna adaptation in Scell dormancy in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic antenna adaptation in Scell dormancy). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic antenna adaptation in Scell dormancy). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic antenna adaptation in Scell dormancy as described herein. For example, the communications manager 620 may include a CSI-RS configuration receiver 625, a CSI-RS receiver 630, a CSI feedback transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The CSI-RS configuration receiver 625 may be configured as or otherwise support a means for receiving, from a base station, signaling indicating a CSI report configuration that indicates CSI-RS resources for use in a dormancy state for one or more Scells, where the CSI-RS resources are mapped to at least one antenna panel configuration of the base station. The CSI-RS receiver 630 may be configured as or otherwise support a means for receiving, in the dormancy state, one or more CSI-RSs on the CSI-RS resources of the one or more Scells according to the CSI report configuration. The CSI feedback transmitter 635 may be configured as or otherwise support a means for transmitting, to the base station, a message reporting CSI feedback based on measurements associated with the received one or more CSI-RSs.

In some cases, the CSI-RS configuration receiver 625, CSI-RS receiver 630, and CSI feedback transmitter 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the CSI-RS configuration receiver 625, CSI-RS receiver 630, and CSI feedback transmitter 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
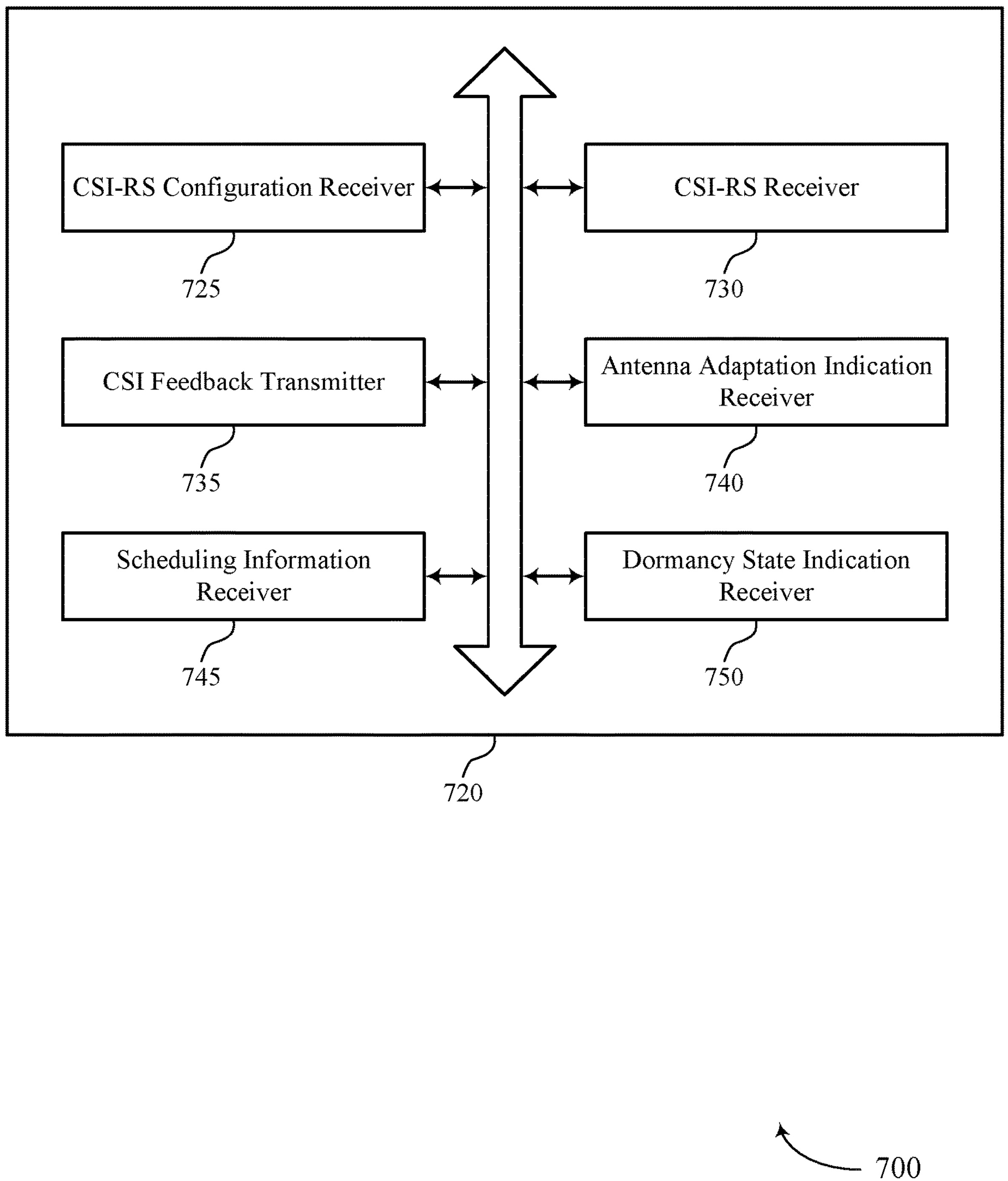
FIG. 7 shows a block diagram of a communications manager that supports dynamic antenna adaptation in Scell dormancy in accordance with aspects of the present disclosure.

FIG. 7 shows a block diagram 700 of a communications manager 720 that supports dynamic antenna adaptation in Scell dormancy in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic antenna adaptation in Scell dormancy as described herein. For example, the communications manager 720 may include a CSI-RS configuration receiver 725, a CSI-RS receiver 730, a CSI feedback transmitter 735, an antenna adaptation indication receiver 740, a scheduling information receiver 745, a dormancy state indication receiver 750, or any combination thereof. Each of these components may communicate, directly or indirectly, with one another (e.g., via one or more buses).

The communications manager 720 may support wireless communications at a UE in accordance with examples as disclosed herein. The CSI-RS configuration receiver 725 may be configured as or otherwise support a means for receiving, from a base station, signaling indicating a CSI report configuration that indicates CSI-RS resources for use in a dormancy state for one or more Scells, where the CSI-RS resources are mapped to at least one antenna panel configuration of the base station. The CSI-RS receiver 730 may be configured as or otherwise support a means for receiving, in the dormancy state, one or more CSI-RSs on the CSI-RS resources of the one or more Scells according to the CSI report configuration. The CSI feedback transmitter 735 may be configured as or otherwise support a means for transmitting, to the base station, a message reporting CSI feedback based on measurements associated with the received one or more CSI-RSs.

In some examples, the antenna adaptation indication receiver 740 may be configured as or otherwise support a means for receiving, in the dormancy state, an antenna adaptation indication based on monitoring a downlink control channel, where the message reporting the CSI feedback is transmitted based on the antenna adaptation indication. In some examples, the antenna adaptation indication is received during a monitoring occasion of the downlink channel configured for receiving the antenna adaptation indication.

In some examples, the scheduling information receiver 745 may be configured as or otherwise support a means for receiving scheduling information for a downlink shared channel based on monitoring a downlink control channel. In some examples, the antenna adaptation indication receiver 740 may be configured as or otherwise support a means for receiving, via the downlink shared channel and based on the scheduling information, a message including an antenna adaptation indication, where the message reporting the CSI feedback is transmitted in accordance with the antenna adaptation indication.

In some examples, to support receiving the one or more CSI-RSs, the CSI-RS receiver 730 may be configured as or otherwise support a means for receiving a first CSI-RS according to a first CSI resource based on determining that the first CSI resource is a most recently configured CSI resource among a set of CSI resources. In some examples, the CSI report configuration is received before entering the dormancy state. In some examples, the CSI report configuration for use in the dormancy state is different than a second CSI report configuration for use in an active state for the one or more Scells.

In some examples, to support receiving signaling indicating the CSI report configuration, the dormancy state indication receiver 750 may be configured as or otherwise support a means for receiving, as part of the signaling, an indication to transition to the dormancy state for the one or more Scells. In some examples, to support receiving signaling indicating the CSI report configuration, the CSI feedback transmitter 735 may be configured as or otherwise support a means for transmitting the message reporting CSI feedback in accordance with the CSI report configuration based on receiving the indication to transition to the dormancy state.

In some examples, the signaling includes DCI.

In some examples, the antenna adaptation indication receiver 740 may be configured as or otherwise support a means for receiving a downlink control information message or a MAC-CE message including an antenna adaptation indication, where the message reporting the CSI feedback is transmitted in accordance with the antenna adaptation indication. In some examples, the antenna adaptation indication indicates an antenna adaptation mode corresponding to an antenna panel configuration of the base station.

In some cases, the CSI-RS configuration receiver 725, CSI-RS receiver 730, CSI feedback transmitter 735, antenna adaptation indication receiver 740, scheduling information receiver 745, and dormancy state indication receiver 750 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the CSI-RS configuration receiver 725, CSI-RS receiver 730, CSI feedback transmitter 735, antenna adaptation indication receiver 740, scheduling information receiver 745, and dormancy state indication receiver 750 discussed herein.

Figure 8:
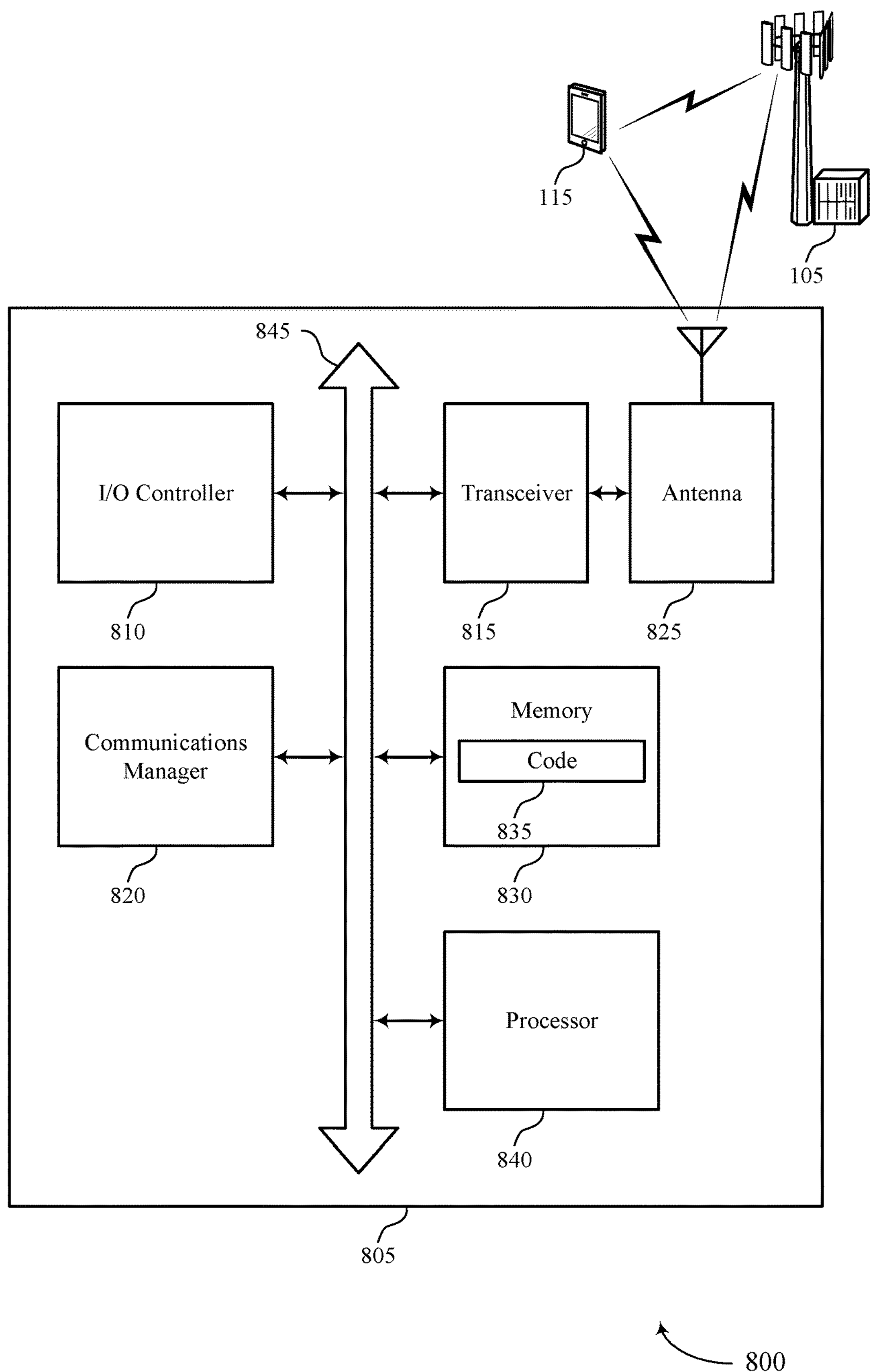
FIG. 8 shows a diagram of a system including a device that supports dynamic antenna adaptation in Scell dormancy in accordance with aspects of the present disclosure.

FIG. 8 shows a diagram of a system 800 including a device 805 that supports dynamic antenna adaptation in Scell dormancy in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic antenna adaptation in Scell dormancy). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, signaling indicating a CSI report configuration that indicates CSI-RS resources for use in a dormancy state for one or more Scells, where the CSI-RS resources are mapped to at least one antenna panel configuration of the base station. The communications manager 820 may be configured as or otherwise support a means for receiving, in the dormancy state, one or more CSI-RSs on the CSI-RS resources of the one or more Scells according to the CSI report configuration. The communications manager 820 may be configured as or otherwise support a means for transmitting, to the base station, a message reporting CSI feedback based on measurements associated with the received one or more CSI-RSs.

By including or configuring the communications manager 820 in accordance with examples as described herein, the device 805 may support techniques for reporting CSI associated with antenna panels or subpanels of a base station using dynamic antenna adaptation while serving an Scell that may be dormant. For example, the device 805 may generate and report CSI at increasing levels of granularity with respect to the antenna panels or subpanels, such the CSI may represent the channel with relatively increased accuracy. Increasing accuracy and efficacy of CSI may enable the device 805, and other devices with which the device 805 communicates (e.g., base stations 105, etc.), to perform more efficient link adaptation procedures, which in turn may increase communications reliability and efficiency in the system.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic antenna adaptation in Scell dormancy as described herein, or the processor 840 and the memory 830 may be otherwise configured to perform or support such operations.

Figure 9:
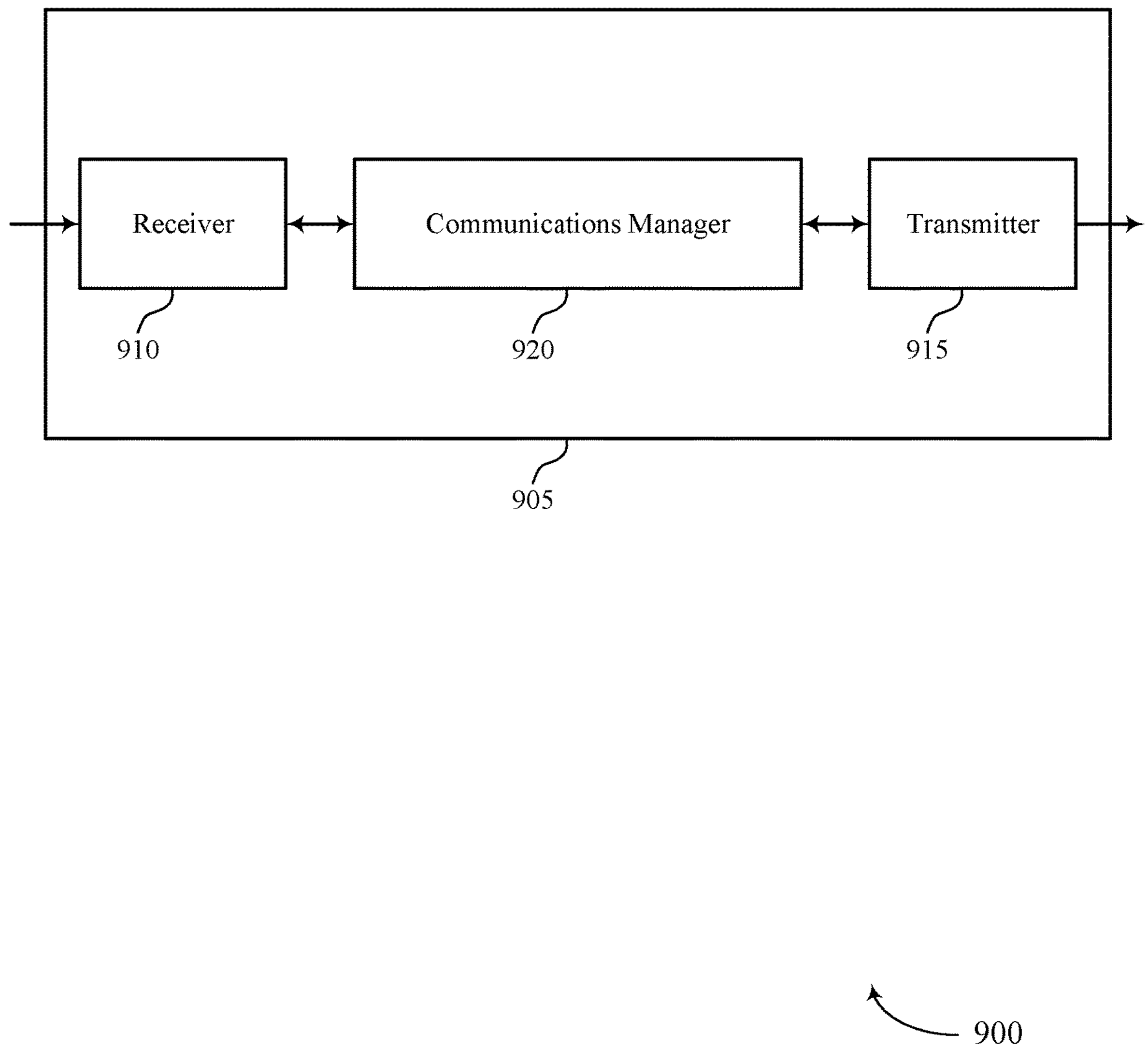
FIGS. 9 and 10 show block diagrams of devices that support dynamic antenna adaptation in Scell dormancy in accordance with aspects of the present disclosure.

FIG. 9 shows a block diagram 900 of a device 905 that supports dynamic antenna adaptation in Scell dormancy in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the antenna adaptation features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic antenna adaptation in Scell dormancy). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic antenna adaptation in Scell dormancy). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic antenna adaptation in S cell dormancy as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting signaling indicating a CSI report configuration that indicates CSI-RS resources for use in a dormancy state for one or more Scells, where the CSI-RS resources are mapped to at least one antenna panel configuration of the base station. The communications manager 920 may be configured as or otherwise support a means for transmitting, to a UE that is in the dormancy state, one or more CSI-RSs on the CSI-RS resources of the one or more Scells according to the CSI report configuration. The communications manager 920 may be configured as or otherwise support a means for receiving, from the UE, a message reporting CSI feedback based on measurements associated with the received one or more CSI-RSs.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for CSI feedback in consideration of panel adaptation at the device 905. For instance, the device 905 may perform panel adaptation by turning off one or more antenna panels or subpanels at the device 905 without negatively impacting CSI procedures at other devices that communicate with the device 905. Further, panel adaptation at the device 905 may reduce power consumption at the device 905.

Figure 10:
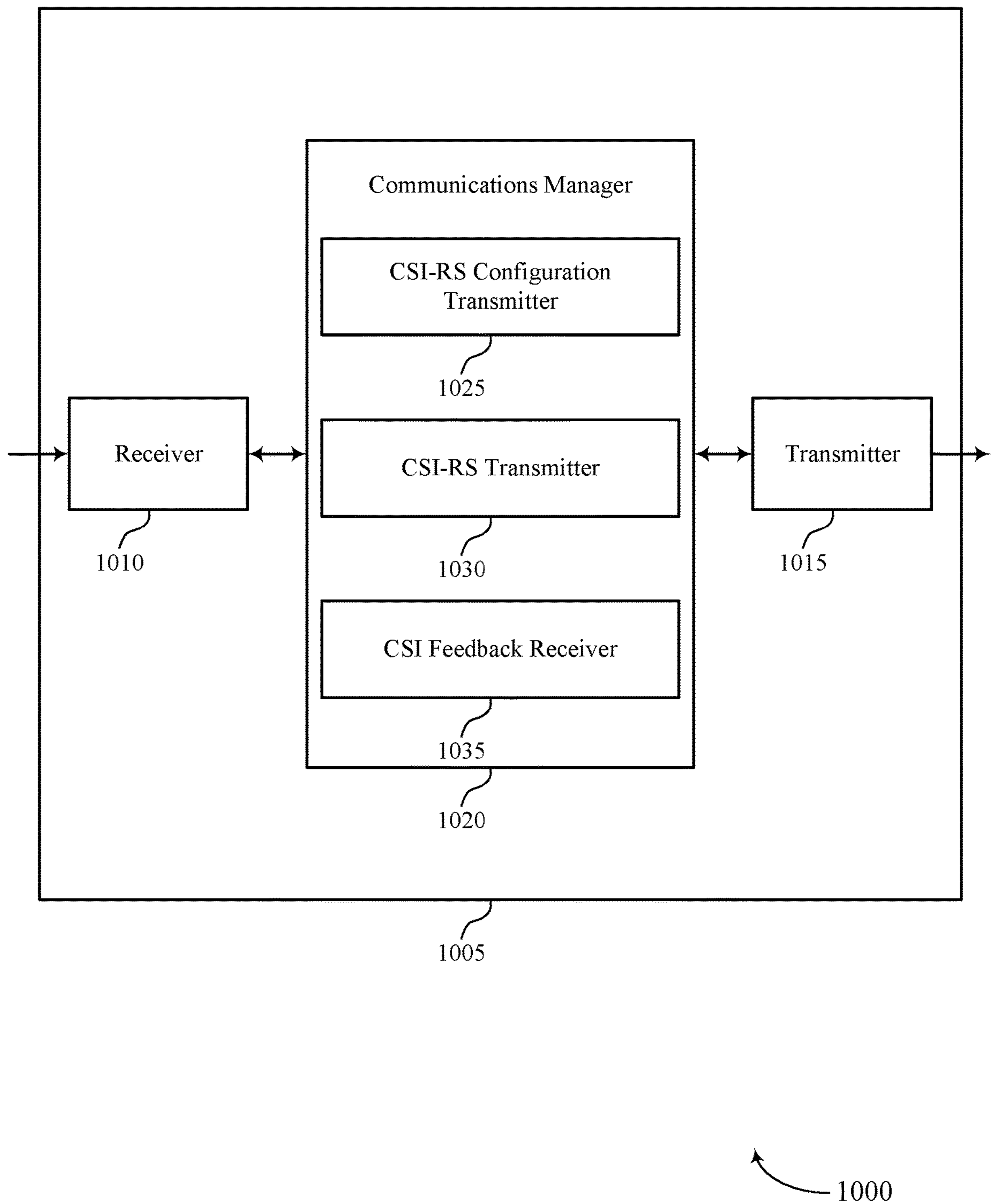

FIG. 10 shows a block diagram 1000 of a device 1005 that supports dynamic antenna adaptation in Scell dormancy in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic antenna adaptation in Scell dormancy). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic antenna adaptation in Scell dormancy). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic antenna adaptation in Scell dormancy as described herein. For example, the communications manager 1020 may include a CSI-RS configuration transmitter 1025, a CSI-RS transmitter 1030, a CSI feedback receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The CSI-RS configuration transmitter 1025 may be configured as or otherwise support a means for transmitting signaling indicating a CSI report configuration that indicates CSI-RS resources for use in a dormancy state for one or more Scells, where the CSI-RS resources are mapped to at least one antenna panel configuration of the base station. The CSI-RS transmitter 1030 may be configured as or otherwise support a means for transmitting, to a UE that is in the dormancy state, one or more CSI-RSs on the CSI-RS resources of the one or more Scells according to the CSI report configuration. The CSI feedback receiver 1035 may be configured as or otherwise support a means for receiving, from the UE, a message reporting CSI feedback based on measurements associated with the received one or more CSI-RSs.

In some cases, the CSI-RS configuration transmitter 1025, CSI-RS transmitter 1030, and CSI feedback receiver 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the CSI-RS configuration transmitter 1025, CSI-RS transmitter 1030, and CSI feedback receiver 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
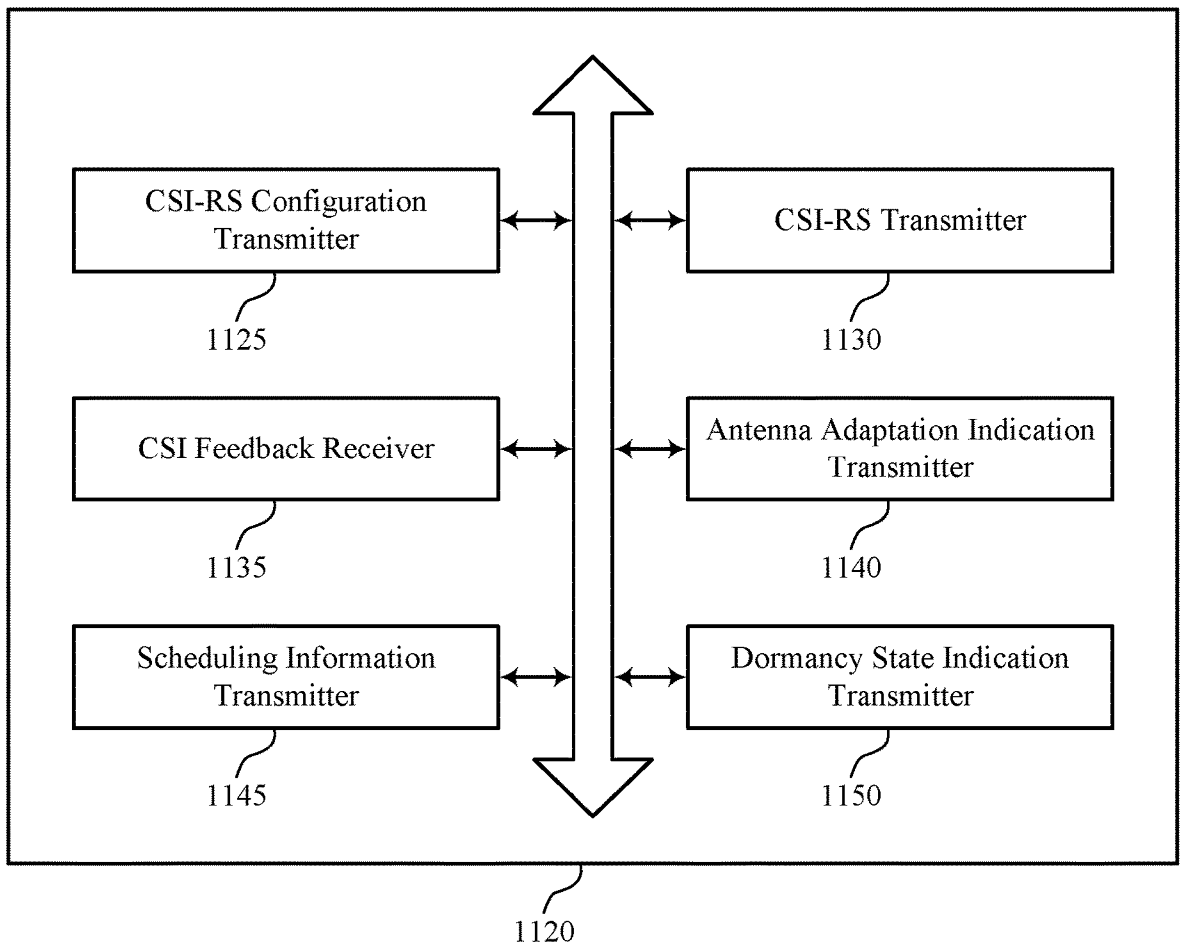
FIG. 11 shows a block diagram of a communications manager that supports dynamic antenna adaptation in Scell dormancy in accordance with aspects of the present disclosure.

FIG. 11 shows a block diagram 1100 of a communications manager 1120 that supports dynamic antenna adaptation in Scell dormancy in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic antenna adaptation in Scell dormancy as described herein. For example, the communications manager 1120 may include a CSI-RS configuration transmitter 1125, a CSI-RS transmitter 1130, a CSI feedback receiver 1135, an antenna adaptation indication transmitter 1140, a scheduling information transmitter 1145, a dormancy state indication transmitter 1150, or any combination thereof. Each of these components may communicate, directly or indirectly, with one another (e.g., via one or more buses).

The communications manager 1120 may support wireless communications at a base station in accordance with examples as disclosed herein. The CSI-RS configuration transmitter 1125 may be configured as or otherwise support a means for transmitting signaling indicating a CSI report configuration that indicates CSI-RS resources for use in a dormancy state for one or more Scells, where the CSI-RS resources are mapped to at least one antenna panel configuration of the base station. The CSI-RS transmitter 1130 may be configured as or otherwise support a means for transmitting, to a UE that is in the dormancy state, one or more CSI-RSs on the CSI-RS resources of the one or more Scells according to the CSI report configuration. The CSI feedback receiver 1135 may be configured as or otherwise support a means for receiving, from the UE, a message reporting CSI feedback based on measurements associated with the received one or more CSI-RSs.

In some examples, the antenna adaptation indication transmitter 1140 may be configured as or otherwise support a means for transmitting, to the UE in the dormancy state, an antenna adaptation indication over a downlink control channel, where the message reporting the CSI feedback is received based on the antenna adaptation indication. In some examples, the antenna adaptation indication is transmitted during a monitoring occasion of the downlink channel configured for transmitting the antenna adaptation indication.

In some examples, the scheduling information transmitter 1145 may be configured as or otherwise support a means for transmitting scheduling information for a downlink shared channel over a downlink control channel. In some examples, the antenna adaptation indication transmitter 1140 may be configured as or otherwise support a means for transmitting, via the downlink shared channel and based on the scheduling information, a message including an antenna adaptation indication, where the message reporting the CSI feedback is received in accordance with the antenna adaptation indication.

In some examples, to support transmitting the one or more CSI-RSs, the CSI-RS transmitter 1130 may be configured as or otherwise support a means for transmitting a first CSI-RS according to a first CSI resource based on determining that the first CSI resource is a most recently configured CSI resource among a set of CSI resources. In some examples, the CSI report configuration for use in the dormancy state is different than a second CSI report configuration for use in an active state for the one or more Scells.

In some examples, to support transmitting signaling indicating the CSI report configuration, the dormancy state indication transmitter 1150 may be configured as or otherwise support a means for transmitting, as part of the signaling, an indication to transition to the dormancy state for the one or more Scells. In some examples, to support transmitting signaling indicating the CSI report configuration, the CSI feedback receiver 1135 may be configured as or otherwise support a means for receiving the message reporting CSI feedback in accordance with the CSI report configuration based on transmitting the indication to transition to the dormancy state. In some examples, the signaling includes DCI.

In some examples, the antenna adaptation indication transmitter 1140 may be configured as or otherwise support a means for transmitting a downlink control information message or a MAC-CE message including an antenna adaptation indication, where the message reporting the CSI feedback is received in accordance with the antenna adaptation indication. In some examples, the antenna adaptation indication indicates an antenna adaptation mode corresponding to an antenna panel configuration of the base station.

In some cases, the CSI-RS configuration transmitter 1125, CSI-RS transmitter 1130, CSI feedback receiver 1135, antenna adaptation indication transmitter 1140, scheduling information transmitter 1145, and dormancy state indication transmitter 1150 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the CSI-RS configuration transmitter 1125, CSI-RS transmitter 1130, CSI feedback receiver 1135, antenna adaptation indication transmitter 1140, scheduling information transmitter 1145, and dormancy state indication transmitter 1150 discussed herein.

Figure 12:
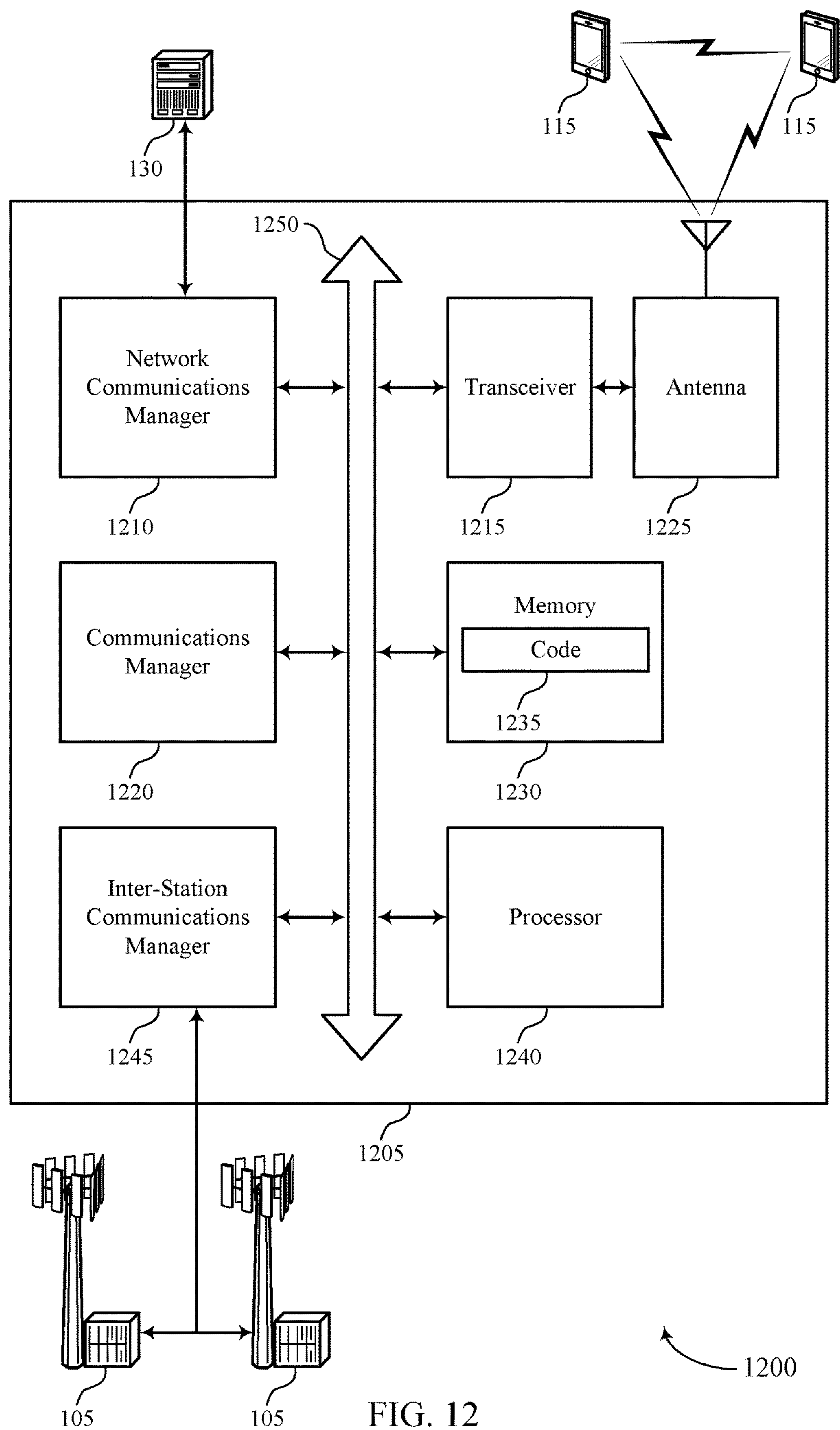
FIG. 12 shows a diagram of a system including a device that supports dynamic antenna adaptation in Scell dormancy in accordance with aspects of the present disclosure.

FIG. 12 shows a diagram of a system 1200 including a device 1205 that supports dynamic antenna adaptation in Scell dormancy in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic antenna adaptation in Scell dormancy). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting signaling indicating a CSI report configuration that indicates CSI-RS resources for use in a dormancy state for one or more Scells, where the CSI-RS resources are mapped to at least one antenna panel configuration of the base station. The communications manager 1220 may be configured as or otherwise support a means for transmitting, to a UE that is in the dormancy state, one or more CSI-RSs on the CSI-RS resources of the one or more Scells according to the CSI report configuration. The communications manager 1220 may be configured as or otherwise support a means for receiving, from the UE, a message reporting CSI feedback based on measurements associated with the received one or more CSI-RSs.

By including or configuring the communications manager 1220 in accordance with examples as described herein, the device 1205 may support techniques for CSI feedback in consideration of panel adaptation at the device 1205. For instance, the device 1205 may configure a UE, such as a UE 115, with a CSI report configuration that indicates a mapping between CSI-RS resources for use in a dormancy state for one or more Scells and one or more antenna panels or subpanels at the device 1205. The device 1205 may therefore receive CSI reports from the UE 115 associated with respective antenna panels or subpanels, which may enable the device 1205 to perform more effective and accurate link adaptation procedures. For example, the device 1205 may adjust one or more parameters for communications with the UE 115 based on one or more received CSI reports, which may increase communications efficiency and reliability. Additionally, or alternatively, the device 1205 may select an antenna panel configuration based on one or more received CSI reports that supports reduced power consumption, increased spectral efficiency and throughput, or a combination thereof.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of dynamic antenna adaptation in Scell dormancy as described herein, or the processor 1240 and the memory 1230 may be otherwise configured to perform or support such operations.

Figure 13:
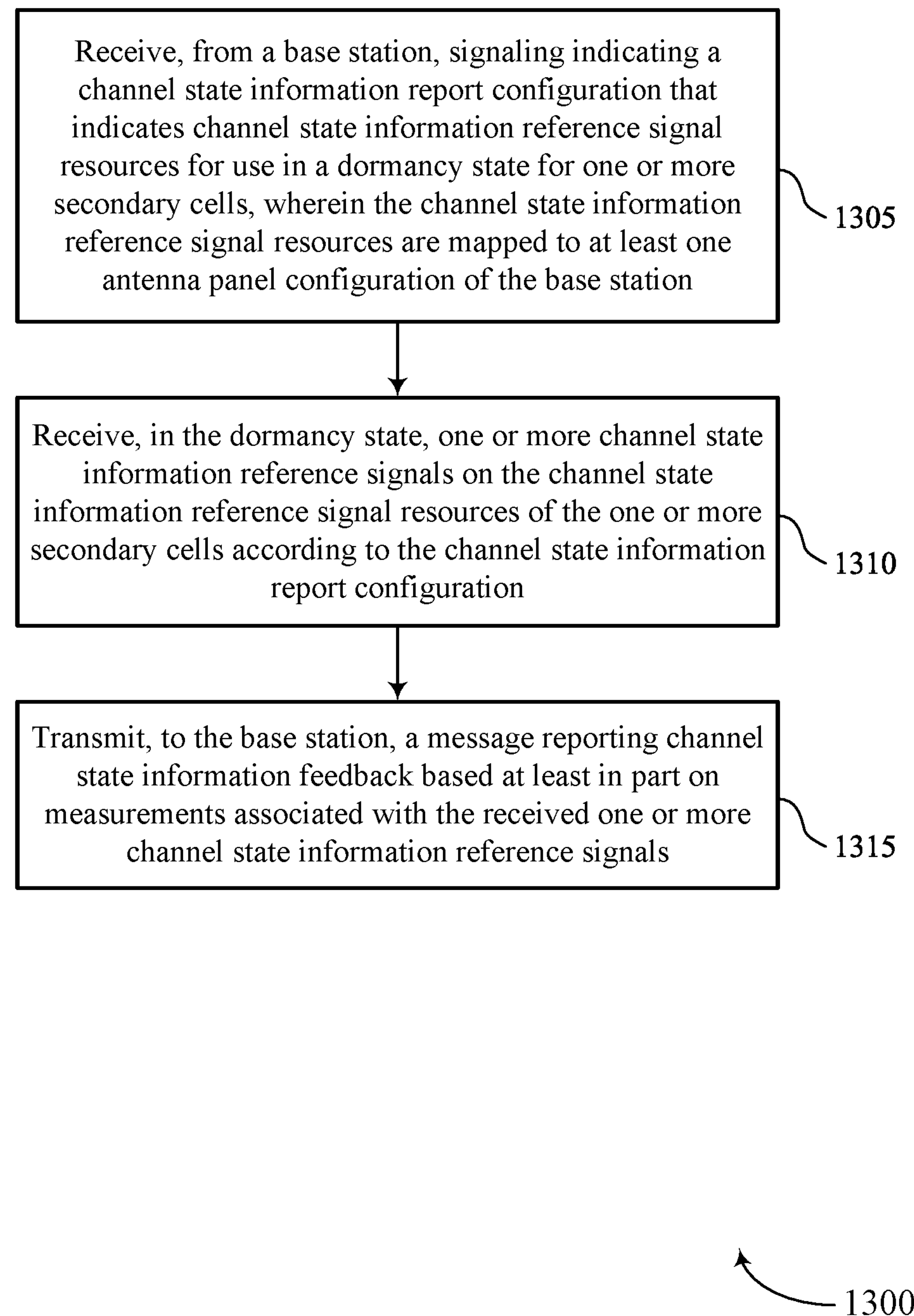
FIGS. 13 through 16 show flowcharts illustrating methods that support dynamic antenna adaptation in Scell dormancy in accordance with aspects of the present disclosure.

FIG. 13 shows a flowchart illustrating a method 1300 that supports dynamic antenna adaptation in Scell dormancy in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, signaling indicating a CSI report configuration that indicates CSI-RS resources for use in a dormancy state for one or more Scells, where the CSI-RS resources are mapped to at least one antenna panel configuration of the base station. The operations of 1305 may be performed in accordance with examples as disclosed herein. In some examples, aspects of the operations of 1305 may be performed by a CSI-RS configuration receiver 725 as described with reference to FIG. 7.

At 1310, the method may include receiving, in the dormancy state, one or more CSI-RSs on the CSI-RS resources of the one or more Scells according to the CSI report configuration. The operations of 1310 may be performed in accordance with examples as disclosed herein. In some examples, aspects of the operations of 1310 may be performed by a CSI-RS receiver 730 as described with reference to FIG. 7.

At 1315, the method may include transmitting, to the base station, a message reporting CSI feedback based on measurements associated with the received one or more CSI-RSs. The operations of 1315 may be performed in accordance with examples as disclosed herein. In some examples, aspects of the operations of 1315 may be performed by a CSI feedback transmitter 735 as described with reference to FIG. 7.

Figure 14:
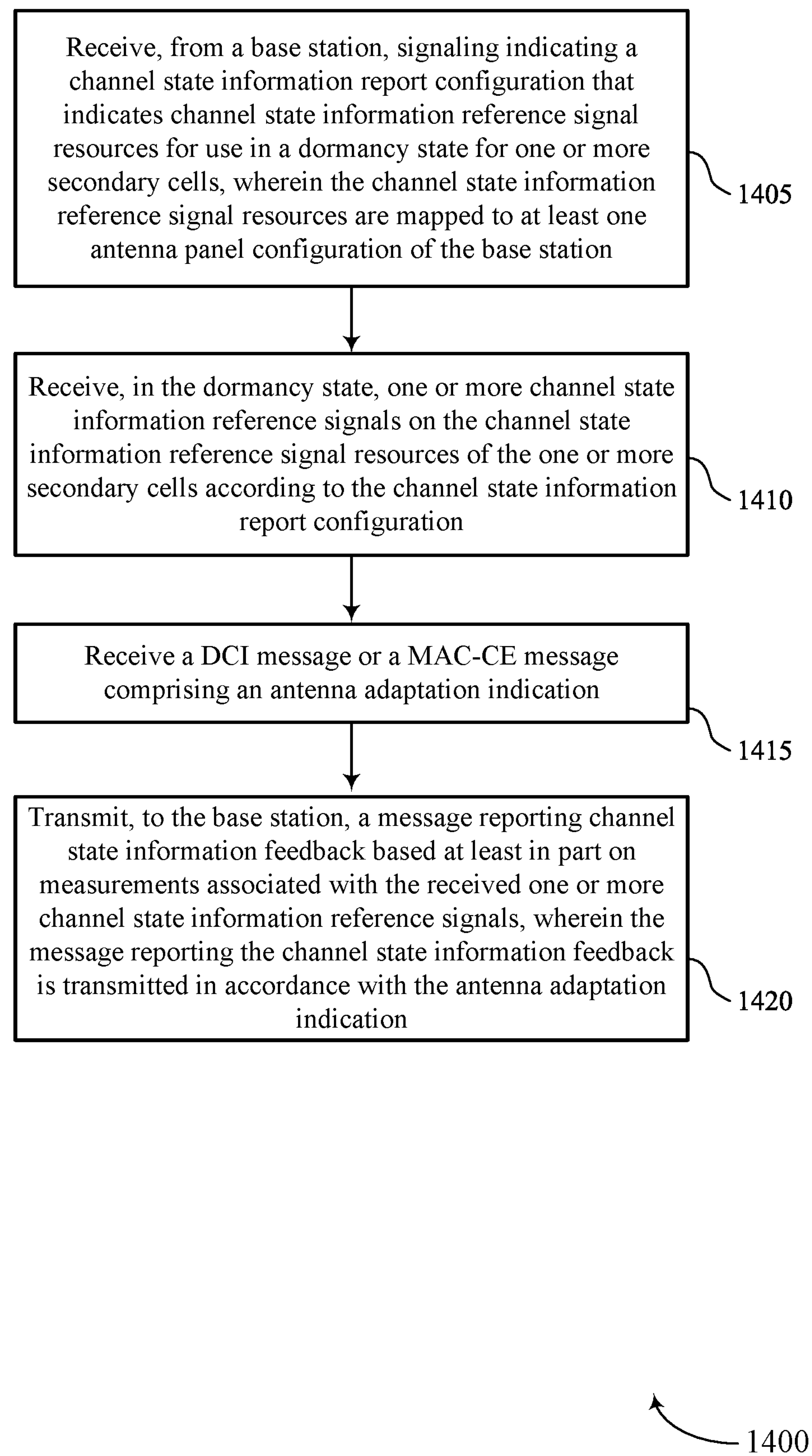

FIG. 14 shows a flowchart illustrating a method 1400 that supports dynamic antenna adaptation in Scell dormancy in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, signaling indicating a CSI report configuration that indicates CSI-RS resources for use in a dormancy state for one or more Scells, where the CSI-RS resources are mapped to at least one antenna panel configuration of the base station. The operations of 1405 may be performed in accordance with examples as disclosed herein. In some examples, aspects of the operations of 1405 may be performed by a CSI-RS configuration receiver 725 as described with reference to FIG. 7.

At 1410, the method may include receiving, in the dormancy state, one or more CSI-RSs on the CSI-RS resources of the one or more Scells according to the CSI report configuration. The operations of 1410 may be performed in accordance with examples as disclosed herein. In some examples, aspects of the operations of 1410 may be performed by a CSI-RS receiver 730 as described with reference to FIG. 7.

At 1415, the method may include receiving a DCI message or a MAC-CE message including an antenna adaptation indication. The operations of 1415 may be performed in accordance with examples as disclosed herein. In some examples, aspects of the operations of 1415 may be performed by an antenna adaptation indication receiver 740 as described with reference to FIG. 7.

At 1420, the method may include transmitting, to the base station, a message reporting CSI feedback based on measurements associated with the received one or more CSI-RSs, where the message reporting the CSI feedback is transmitted in accordance with the antenna adaptation indication. The operations of 1420 may be performed in accordance with examples as disclosed herein. In some examples, aspects of the operations of 1420 may be performed by a CSI feedback transmitter 735 as described with reference to FIG. 7.

Figure 15:
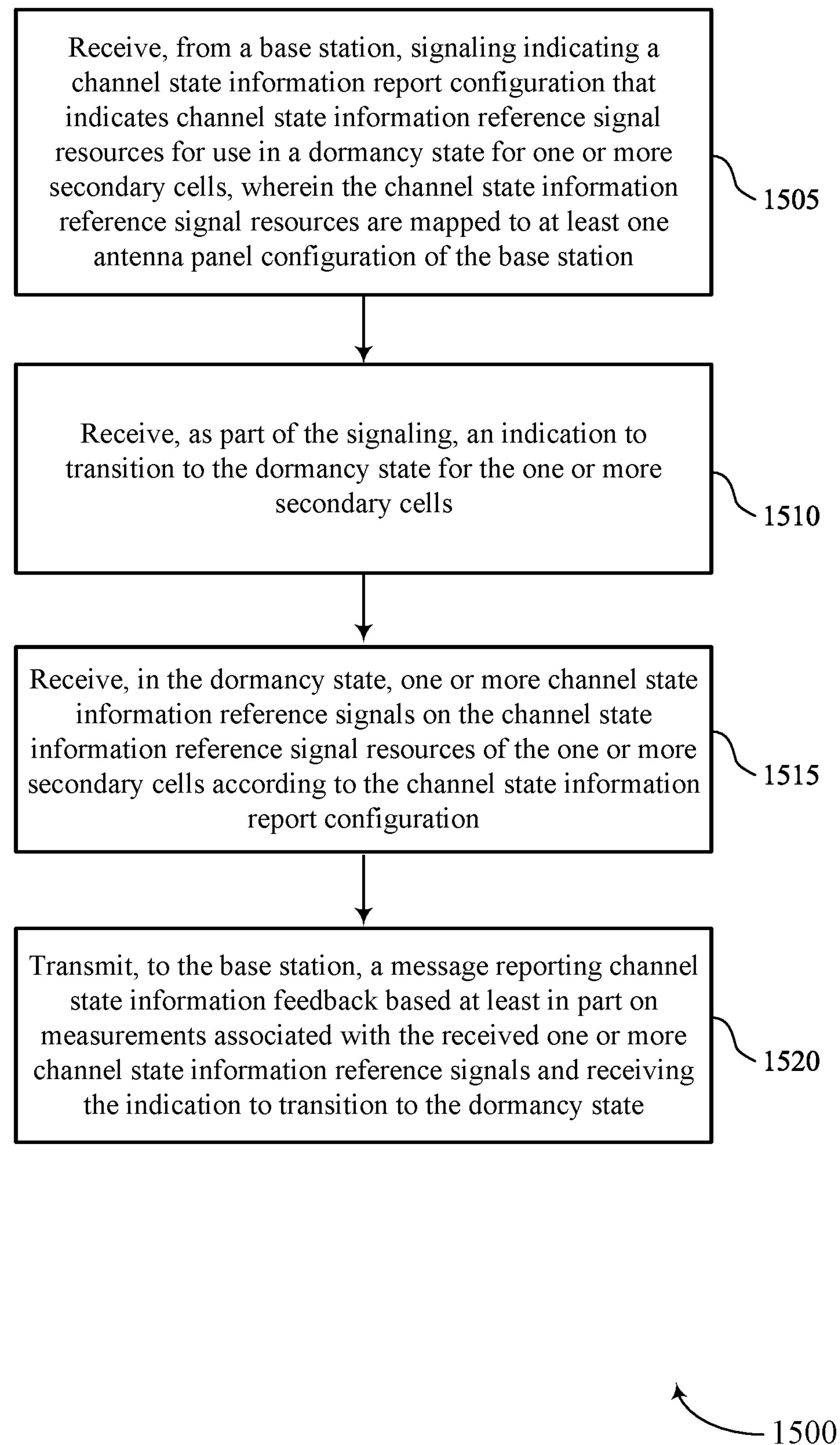

FIG. 15 shows a flowchart illustrating a method 1500 that supports dynamic antenna adaptation in Scell dormancy in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, signaling indicating a CSI report configuration that indicates CSI-RS resources for use in a dormancy state for one or more Scells, where the CSI-RS resources are mapped to at least one antenna panel configuration of the base station. The operations of 1505 may be performed in accordance with examples as disclosed herein. In some examples, aspects of the operations of 1505 may be performed by a CSI-RS configuration receiver 725 as described with reference to FIG. 7.

At 1510, the method may include receiving, as part of the signaling, an indication to transition to the dormancy state for the one or more Scells. The operations of 1510 may be performed in accordance with examples as disclosed herein. In some examples, aspects of the operations of 1510 may be performed by a dormancy state indication receiver 750 as described with reference to FIG. 7.

At 1515, the method may include receiving, in the dormancy state, one or more CSI-RSs on the CSI-RS resources of the one or more Scells according to the CSI report configuration. The operations of 1515 may be performed in accordance with examples as disclosed herein. In some examples, aspects of the operations of 1515 may be performed by a CSI-RS receiver 730 as described with reference to FIG. 7.

At 1520, the method may include transmitting, to the base station, a message reporting CSI feedback based on measurements associated with the received one or more CSI-RSs and receiving the indication to transition to the dormancy state. The operations of 1520 may be performed in accordance with examples as disclosed herein. In some examples, aspects of the operations of 1520 may be performed by a CSI feedback transmitter 735 as described with reference to FIG. 7.

Figure 16:
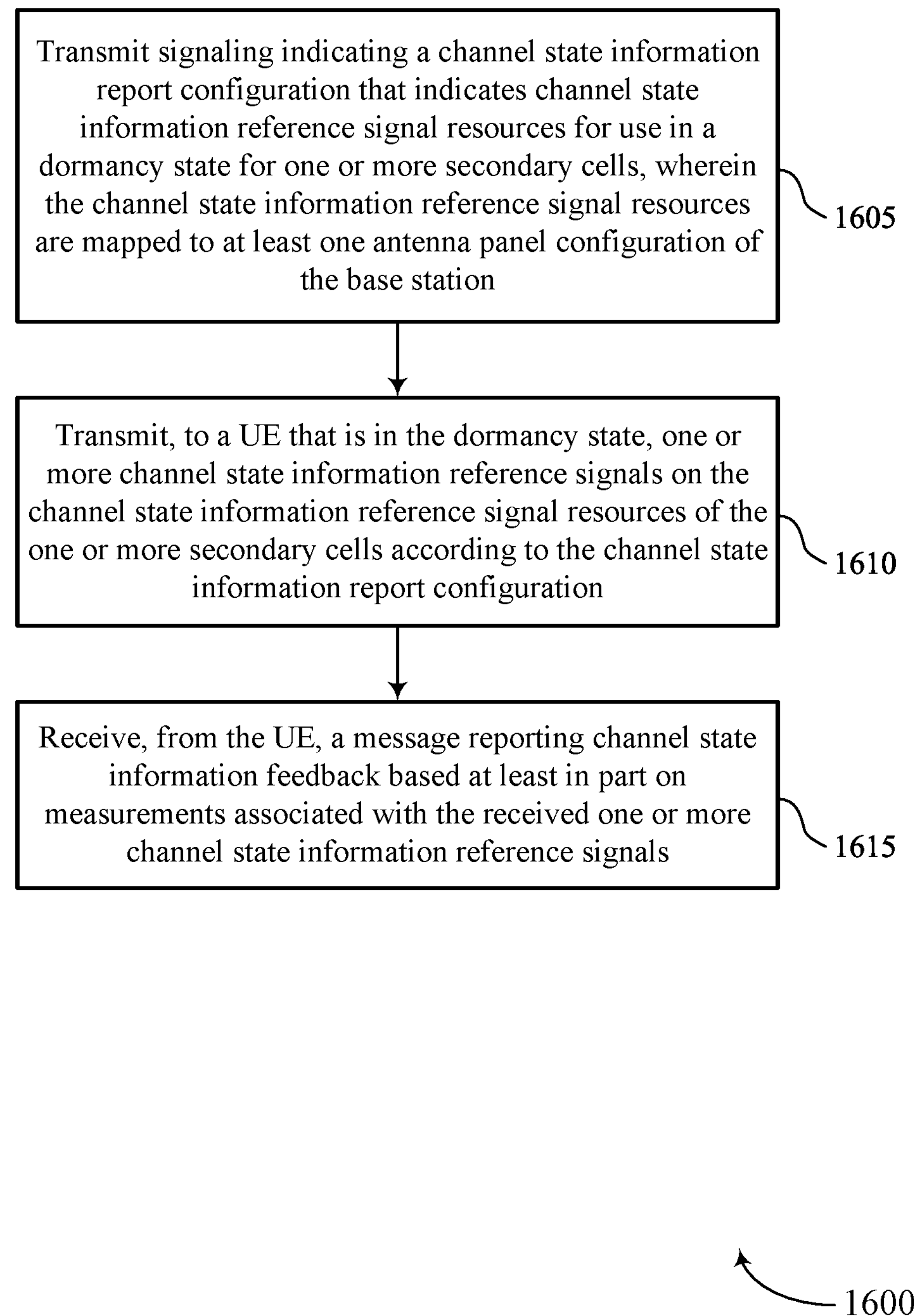

FIG. 16 shows a flowchart illustrating a method 1600 that supports dynamic antenna adaptation in Scell dormancy in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting signaling indicating a CSI report configuration that indicates CSI-RS resources for use in a dormancy state for one or more Scells, where the CSI-RS resources are mapped to at least one antenna panel configuration of the base station. The operations of 1605 may be performed in accordance with examples as disclosed herein. In some examples, aspects of the operations of 1605 may be performed by a CSI-RS configuration transmitter 1125 as described with reference to FIG. 11.

At 1610, the method may include transmitting, to a UE that is in the dormancy state, one or more CSI-RSs on the CSI-RS resources of the one or more Scells according to the CSI report configuration. The operations of 1610 may be performed in accordance with examples as disclosed herein. In some examples, aspects of the operations of 1610 may be performed by a CSI-RS transmitter 1130 as described with reference to FIG. 11.

At 1615, the method may include receiving, from the UE, a message reporting CSI feedback based on measurements associated with the received one or more CSI-RSs. The operations of 1615 may be performed in accordance with examples as disclosed herein. In some examples, aspects of the operations of 1615 may be performed by a CSI feedback receiver 1135 as described with reference to FIG. 11.

The following provides an overview of aspects of the present disclosure:

Aspect 1: A method for wireless communications at a UE, comprising: receiving, from a base station, signaling indicating a CSI report configuration that indicates CSI-RS resources for use in a dormancy state for one or more Scells, wherein the CSI-RS resources are mapped to at least one antenna panel configuration of the base station; receiving, in the dormancy state, one or more CSI-RSs on the CSI-RS resources of the one or more Scells according to the CSI report configuration; and transmitting, to the base station, a message reporting CSI feedback based at least in part on measurements associated with the received one or more CSI-RSs.

Aspect 2: The method of aspect 1, further comprising: receiving, in the dormancy state, an antenna adaptation indication based at least in part on monitoring a downlink control channel, wherein the message reporting the CSI feedback is transmitted based at least in part on the antenna adaptation indication.

Aspect 3: The method of aspect 2, wherein the antenna adaptation indication is received during a monitoring occasion of the downlink channel configured for receiving the antenna adaptation indication.

Aspect 4: The method of any of aspects 1 through 3, further comprising: receiving scheduling information for a downlink shared channel based at least in part on monitoring a downlink control channel; and receiving, via the downlink shared channel and based at least in part on the scheduling information, a message comprising an antenna adaptation indication, wherein the message reporting the CSI feedback is transmitted in accordance with the antenna adaptation indication.

Aspect 5: The method of any of aspects 1 through 4, wherein receiving the one or more CSI-RSs further comprises: receiving a first CSI-RS according to a first CSI resource based at least in part on determining that the first CSI resource is a most recently configured CSI resource among a set of CSI resources.

Aspect 6: The method of any of aspects 1 through 5, wherein the CSI report configuration is received before entering the dormant state.

Aspect 7: The method of any of aspects 1 through 6, wherein the CSI report configuration for use in the dormancy state is different than a second CSI report configuration for use in an active state for the one or more Scells.

Aspect 8: The method of aspect 7, wherein receiving signaling indicating the CSI report configuration further comprises: receiving, as part of the signaling, an indication to transition to the dormancy state for the one or more Scells; and transmitting the message reporting CSI feedback in accordance with the CSI report configuration based at least in part on receiving the indication to transition to the dormancy state.

Aspect 9: The method of aspect 8, wherein the signaling comprises DCI.

Aspect 10: The method of any of aspects 1 through 9, further comprising: receiving a DCI message or a MAC-CE message comprising an antenna adaptation indication, wherein the message reporting the CSI feedback is transmitted in accordance with the antenna adaptation indication.

Aspect 11: The method of aspect 10, wherein the antenna adaptation indication indicates an antenna adaptation mode corresponding to an antenna panel configuration of the base station.

Aspect 12: A method for wireless communications at a base station, comprising: transmitting signaling indicating a CSI report configuration that indicates CSI-RS resources for use in a dormancy state for one or more Scells, wherein the CSI-RS resources are mapped to at least one antenna panel configuration of the base station; transmitting, to a UE that is in the dormancy state, one or more CSI-RSs on the CSI-RS resources of the one or more Scells according to the CSI report configuration; and receiving, from the UE, a message reporting CSI feedback based at least in part on measurements associated with the received one or more CSI-RSs.

Aspect 13: The method of aspect 12, further comprising: transmitting, to the UE in the dormancy state, an antenna adaptation indication over a downlink control channel, wherein the message reporting the CSI feedback is received based at least in part on the antenna adaptation indication.

Aspect 14: The method of aspect 13, wherein the antenna adaptation indication is transmitted during a monitoring occasion of the downlink channel configured for transmitting the antenna adaptation indication.

Aspect 15: The method of any of aspects 12 through 14, further comprising: transmitting scheduling information for a downlink shared channel over a downlink control channel; and transmitting, via the downlink shared channel and based at least in part on the scheduling information, a message comprising an antenna adaptation indication, wherein the message reporting the CSI feedback is received in accordance with the antenna adaptation indication.

Aspect 16: The method of any of aspects 12 through 15, wherein transmitting the one or more CSI-RSs further comprises: transmitting a first CSI-RS according to a first CSI resource based at least in part on determining that the first CSI resource is a most recently configured CSI resource among a set of CSI resources.

Aspect 17: The method of any of aspects 12 through 16, wherein the CSI report configuration for use in the dormancy state is different than a second CSI report configuration for use in an active state for the one or more Scells.

Aspect 18: The method of aspect 17, wherein transmitting signaling indicating the CSI report configuration further comprises: transmitting, as part of the signaling, an indication to transition to the dormancy state for the one or more Scells; and receiving the message reporting CSI feedback in accordance with the CSI report configuration based at least in part on transmitting the indication to transition to the dormancy state.

Aspect 19: The method of aspect 18, wherein the signaling comprises DCI.

Aspect 20: The method of any of aspects 12 through 19, further comprising: transmitting a DCI message or a MAC-CE message comprising an antenna adaptation indication, wherein the message reporting the CSI feedback is received in accordance with the antenna adaptation indication.

Aspect 21: The method of aspect 20, wherein the antenna adaptation indication indicates an antenna adaptation mode corresponding to an antenna panel configuration of the base station.

Aspect 22: An apparatus for wireless communications at a UE, comprising a processor; memory coupled with the processor; and instructions stored in the memory and executable by the processor to cause the apparatus to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a base station, comprising a processor; memory coupled with the processor; and instructions stored in the memory and executable by the processor to cause the apparatus to perform a method of any of aspects 12 through 21.

Aspect 26: An apparatus for wireless communications at a base station, comprising at least one means for performing a method of any of aspects 12 through 21.

Aspect 27: A non-transitory computer-readable medium storing code for wireless communications at a base station, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a base station, signaling indicating a channel state information report configuration that indicates channel state information reference signal resources for use in a dormancy state for one or more secondary cells, wherein the channel state information reference signal resources are mapped to at least one antenna panel configuration of the base station;

receiving, in the dormancy state, one or more channel state information reference signals on the channel state information reference signal resources of the one or more secondary cells according to the channel state information report configuration;

receiving, in the dormancy state, an antenna adaptation indication based at least in part on monitoring a downlink control channel; and transmitting, to the base station, a message reporting channel state information feedback based at least in part on measurements associated with the received one or more channel state information reference signals, wherein the message reporting the channel state information feedback is transmitted based at least in part on the antenna adaptation indication.

2. The method of claim 1, wherein the antenna adaptation indication is received during a monitoring occasion of the downlink control channel configured for receiving the antenna adaptation indication.

3. The method of claim 1, further comprising:

receiving scheduling information for a downlink shared channel based at least in part on monitoring the downlink control channel;

wherein receiving the antenna adaptation indication comprises receiving, via the downlink shared channel and based at least in part on the scheduling information, a message comprising the antenna adaptation indication.

4. The method of claim 1, wherein receiving the one or more channel state information reference signals further comprises:

receiving a first channel state information reference signal according to a first channel state information resource based at least in part on determining that the first channel state information resource is a most recently configured channel state information resource among a set of channel state information resources.

5. The method of claim 1, wherein the channel state information report configuration is received before entering the dormancy state.

6. The method of claim 1, wherein the channel state information report configuration for use in the dormancy state is different than a second channel state information report configuration for use in an active state for the one or more secondary cells.

7. The method of claim 6, wherein receiving signaling indicating the channel state information report configuration further comprises:

receiving, as part of the signaling, an indication to transition to the dormancy state for the one or more secondary cells; and transmitting the message reporting channel state information feedback in accordance with the channel state information report configuration based at least in part on receiving the indication to transition to the dormancy state.

8. The method of claim 7, wherein the signaling comprises downlink control information.

9. The method of claim 1, wherein receiving the antenna adaptation indication comprises:

receiving a downlink control information message or a media access control control element message comprising the antenna adaptation indication.

10. The method of claim 1, wherein the antenna adaptation indication indicates an antenna adaptation mode corresponding to an antenna panel configuration of the base station.

11. A method for wireless communications at a base station, comprising:

transmitting signaling indicating a channel state information report configuration that indicates channel state information reference signal resources for use in a dormancy state for one or more secondary cells, wherein the channel state information reference signal resources are mapped to at least one antenna panel configuration of the base station;

transmitting, to a user equipment (UE) that is in the dormancy state, one or more channel state information reference signals on the channel state information reference signal resources of the one or more secondary cells according to the channel state information report configuration;

transmitting, to the UE in the dormancy state, an antenna adaptation indication over a downlink control channel; and receiving, from the UE, a message reporting channel state information feedback based at least in part on measurements associated with the received one or more channel state information reference signals, wherein the message reporting the channel state information feedback is received based at least in part on the antenna adaptation indication.

12. The method of claim 11, wherein the antenna adaptation indication is transmitted during a monitoring occasion of the downlink control channel configured for transmitting the antenna adaptation indication.

13. The method of claim 11, further comprising:

transmitting scheduling information for a downlink shared channel over the downlink control channel;

wherein transmitting the antenna adaptation indication comprises transmitting, via the downlink shared channel and based at least in part on the scheduling information, a message comprising the antenna adaptation indication.

14. The method of claim 11, wherein transmitting the one or more channel state information reference signals further comprises:

transmitting a first channel state information reference signal according to a first channel state information resource based at least in part on determining that the first channel state information resource is a most recently configured channel state information resource among a set of channel state information resources.

15. The method of claim 11, wherein the channel state information report configuration for use in the dormancy state is different than a second channel state information report configuration for use in an active state for the one or more secondary cells.

16. The method of claim 15, wherein transmitting signaling indicating the channel state information report configuration further comprises:

transmitting, as part of the signaling, an indication to transition to the dormancy state for the one or more secondary cells; and receiving the message reporting channel state information feedback in accordance with the channel state information report configuration based at least in part on transmitting the indication to transition to the dormancy state.

17. The method of claim 16, wherein the signaling comprises downlink control information.

18. The method of claim 11, wherein transmitting the antenna adaptation indication comprises:

transmitting a downlink control information message or a media access control control element message comprising the antenna adaptation indication.

19. The method of claim 11, wherein the antenna adaptation indication indicates an antenna adaptation mode corresponding to an antenna panel configuration of the base station.

20. An apparatus for wireless communications at a user equipment (UE), comprising:

a processor;

memory coupled with the processor; and instructions stored in the memory and executable by the processor to cause the apparatus to:

receive, from a base station, signaling indicating a channel state information report configuration that indicates channel state information reference signal resources for use in a dormancy state for one or more secondary cells, wherein the channel state information reference signal resources are mapped to at least one antenna panel configuration of the base station;

receive, in the dormancy state, one or more channel state information reference signals on the channel state information reference signal resources of the one or more secondary cells according to the channel state information report configuration;

receive, in the dormancy state, an antenna adaptation indication based at least in part on monitoring a downlink control channel; and transmit, to the base station, a message reporting channel state information feedback based at least in part on measurements associated with the received one or more channel state information reference signals, wherein the message reporting the channel state information feedback is transmitted based at least in part on the antenna adaptation indication.

21. The apparatus of claim 20, wherein the antenna adaptation indication is received during a monitoring occasion of the downlink control channel configured for receiving the antenna adaptation indication.

22. The apparatus of claim 20, wherein the instructions are further executable by the processor to cause the apparatus to:

receive scheduling information for a downlink shared channel based at least in part on monitoring the downlink control channel;

wherein the instructions are executable by the processor to receive the antenna adaptation indication by being executable by the processor to receive, via the downlink shared channel and based at least in part on the scheduling information, a message comprising the antenna adaptation indication.

23. The apparatus of claim 20, wherein the instructions are further executable by the processor to receive the one or more channel state information reference signals by being executable by the processor to:

receive a first channel state information reference signal according to a first channel state information resource based at least in part on determining that the first channel state information resource is a most recently configured channel state information resource among a set of channel state information resources.

24. An apparatus for wireless communications at a base station, comprising:

a processor;

memory coupled with the processor; and instructions stored in the memory and executable by the processor to cause the apparatus to:

transmit signaling indicating a channel state information report configuration that indicates channel state information reference signal resources for use in a dormancy state for one or more secondary cells, wherein the channel state information reference signal resources are mapped to at least one antenna panel configuration of the base station;

transmit, to a user equipment (UE) that is in the dormancy state, one or more channel state information reference signals on the channel state information reference signal resources of the one or more secondary cells according to the channel state information report configuration;

transmit, to the UE in the dormancy state, an antenna adaptation indication over a downlink control channel; and receive, from the UE, a message reporting channel state information feedback based at least in part on measurements associated with the received one or more channel state information reference signals, wherein the message reporting the channel state information feedback is received based at least in part on the antenna adaptation indication.

25. The apparatus of claim 24, wherein the antenna adaptation indication is transmitted during a monitoring occasion of the downlink control channel configured for transmitting the antenna adaptation indication.

26. The apparatus of claim 24, wherein the instructions are further executable by the processor to cause the apparatus to:

transmit scheduling information for a downlink shared channel over the downlink control channel;

wherein the instructions are executable by the processor to transmit the antenna adaptation indication by being executable by the processor to transmit, via the downlink shared channel and based at least in part on the scheduling information, a message comprising the antenna adaptation indication.

* * * * *